US011713973B2

(12) United States Patent
Yu et al.

(10) Patent No.: US 11,713,973 B2
(45) Date of Patent: *Aug. 1, 2023

(54) METHOD AND SYSTEM FOR REPOSITIONING A SERVICE LOCATION

(71) Applicant: Uber Technologies, Inc., San Francisco, CA (US)

(72) Inventors: Ryan Yu, San Francisco, CA (US); John Nathaniel Ford, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/146,154

(22) Filed: Jan. 11, 2021

(65) Prior Publication Data

US 2021/0131815 A1 May 6, 2021

Related U.S. Application Data

(63) Continuation of application No. 15/671,062, filed on Aug. 7, 2017, now Pat. No. 10,890,457.

(Continued)

(51) Int. Cl.
*G01C 21/34* (2006.01)
*G01C 21/36* (2006.01)
*H04M 3/42* (2006.01)

(52) U.S. Cl.
CPC ..... *G01C 21/3438* (2013.01); *G01C 21/3415* (2013.01); *G01C 21/3423* (2013.01);
(Continued)

(58) Field of Classification Search
CPC ............ G01C 21/3438; G01C 21/3415; G01C 21/3423; G01C 21/3492; G01C 21/3614;
(Continued)

(56) References Cited

U.S. PATENT DOCUMENTS 5,557,522 A 9/1996 Nakayama
5,948,040 A 9/1999 DeLorme
(Continued)

FOREIGN PATENT DOCUMENTS

CN 104575072 4/2015
CN 104931063 9/2015
(Continued)

OTHER PUBLICATIONS

EESR in EP 18873921.3 dated Jul. 14, 2021.
(Continued)

*Primary Examiner* — Russell Frejd
(74) *Attorney, Agent, or Firm* — Mahamedi IP Law LLP

(57) ABSTRACT

A network computer service can receive a service request associated with a first service location. Additionally, the network computer service can detect a user action to associate the service request with a second service location. In some examples, the user input can be detected on a user device. In other examples, the second service location can be different from the first service location. Moreover, the network computer service can determine the second service location satisfies a predetermined permissibility criterion for permitting change of the first service location to the second service location. In response to determining the second service location satisfies the predetermined permissibility criterion, the network computer service can transmit an instruction to cause a device to associate the service request with the second service location in place of the first service location.

19 Claims, 12 Drawing Sheets

Related U.S. Application Data

(60) Provisional application No. 62/446,292, filed on Jan. 13, 2017.

(52) U.S. Cl.
CPC ....... *G01C 21/3492* (2013.01); *G01C 21/362* (2013.01); *G01C 21/3614* (2013.01); *H04M 3/42* (2013.01); *H04M 2242/30* (2013.01)

(58) Field of Classification Search
CPC .. G01C 21/362; H04M 3/42; H04M 2242/30; H04W 4/02
See application file for complete search history.

(56) References Cited

U.S. PATENT DOCUMENTS

| | | | |
|---|---|---|---|
| 6,058,339 | A | 5/2000 | Takiguchi |
| 6,233,517 | B1 | 5/2001 | Froeberg |
| 6,321,158 | B1 | 11/2001 | DeLorme |
| 7,263,437 | B2 | 8/2007 | Hirose |
| 7,822,426 | B1 | 10/2010 | Wuersch |
| 8,005,488 | B2 | 8/2011 | Staffaroni |
| 8,565,789 | B2 | 10/2013 | Staffaroni |
| 9,075,136 | B1 | 7/2015 | Joao |
| 9,158,414 | B1 | 10/2015 | Gluzberg |
| 9,452,785 | B2 | 9/2016 | Tsuneyama |
| 9,547,307 | B1 | 1/2017 | Cullinane |
| 9,562,785 | B1 | 2/2017 | Racah |
| 9,599,477 | B1 | 3/2017 | Aula |
| 9,613,386 | B1 | 4/2017 | Arden |
| 9,631,933 | B1 | 4/2017 | Aula |
| 9,715,233 | B1 | 6/2017 | Mandeville-Clark |
| 9,702,714 | B2 | 7/2017 | Botea |
| 9,733,096 | B2 | 8/2017 | Colijn |
| 10,731,998 | B2 | 8/2020 | Rahematpura |
| 2004/0249818 | A1 | 12/2004 | Isaac |
| 2006/0235739 | A1 | 10/2006 | Levis |
| 2007/0150375 | A1 | 6/2007 | Yang |
| 2007/0233373 | A1 | 10/2007 | Choi |
| 2008/0275645 | A1 | 11/2008 | Hoshino |
| 2008/0277183 | A1 | 11/2008 | Huang |
| 2009/0156241 | A1 | 6/2009 | Staffaroni |
| 2009/0216600 | A1 | 8/2009 | Hill |
| 2009/0326991 | A1 | 12/2009 | Wei |
| 2011/0320232 | A1 | 12/2011 | Staffaroni |
| 2012/0004840 | A1 | 1/2012 | Lee |
| 2012/0130627 | A1 | 5/2012 | Islam |
| 2013/0073327 | A1 | 3/2013 | Edelberg |
| 2013/0132140 | A1 | 5/2013 | Amin |
| 2013/0132246 | A1 | 5/2013 | Amin |
| 2013/0159028 | A1 | 6/2013 | Lerenc |
| 2014/0011522 | A1 | 1/2014 | Lin |
| 2014/0129135 | A1 | 5/2014 | Holden |
| 2014/0365250 | A1 | 12/2014 | Ikeda |
| 2015/0006072 | A1 | 1/2015 | Goldberg |
| 2015/0067878 | A1 | 3/2015 | Steelberg |
| 2015/0081362 | A1 | 3/2015 | Chadwick |
| 2015/0143275 | A1 | 5/2015 | Lee |
| 2015/0161564 | A1 | 6/2015 | Sweeney |
| 2015/0219464 | A1 | 8/2015 | Beaurepaire |
| 2015/0228192 | A1 | 8/2015 | Kawamoto |
| 2015/0248689 | A1 | 9/2015 | Paul |
| 2015/0254581 | A1 | 9/2015 | Brahme |
| 2015/0278618 | A1 | 10/2015 | Nuscheler |
| 2015/0302342 | A1 | 10/2015 | Yeh |
| 2015/0317568 | A1 | 11/2015 | Grasso |
| 2015/0339923 | A1 | 11/2015 | Konig et al. |
| 2015/0339928 | A1 | 11/2015 | Ramanujam |
| 2016/0027306 | A1 | 1/2016 | Lambert |
| 2016/0027307 | A1 | 1/2016 | Abhyanker |
| 2016/0034828 | A1 | 2/2016 | Sarawgi |
| 2016/0034845 | A1 | 2/2016 | Hiyama |
| 2016/0042303 | A1 | 2/2016 | Medina |
| 2016/0048804 | A1 | 2/2016 | Paul |
| 2016/0055769 | A1 | 2/2016 | Angelescu |
| 2016/0071411 | A1 | 3/2016 | Stenneth |
| 2016/0187150 | A1 | 6/2016 | Sherman |
| 2016/0301698 | A1 | 10/2016 | Katara |
| 2016/0320195 | A1 | 11/2016 | Liu |
| 2016/0320198 | A1 | 11/2016 | Liu |
| 2016/0321771 | A1 | 11/2016 | Liu |
| 2016/0370194 | A1 | 12/2016 | Colijn |
| 2017/0052034 | A1 | 2/2017 | Magazinik |
| 2017/0059347 | A1 | 3/2017 | Flier |
| 2017/0103490 | A1 | 4/2017 | Haparnas |
| 2017/0153714 | A1 | 6/2017 | Gao |
| 2017/0160092 | A1 | 6/2017 | Botea |
| 2017/0169366 | A1 | 6/2017 | Klein |
| 2017/0169535 | A1 | 6/2017 | Tolkin |
| 2017/0193404 | A1 | 7/2017 | Yoo |
| 2017/0213308 | A1 | 7/2017 | Wellborn |
| 2017/0277191 | A1 | 9/2017 | Fairfield |
| 2017/0286884 | A1 | 10/2017 | Shoval |
| 2017/0293950 | A1 | 10/2017 | Rathod |
| 2017/0300848 | A1 | 10/2017 | Shoval |
| 2017/0309171 | A1 | 10/2017 | Zhao |
| 2017/0314948 | A1 | 11/2017 | Tsuneyama et al. |
| 2017/0337810 | A1 | 11/2017 | Abe |
| 2017/0365030 | A1 | 12/2017 | Shoham |
| 2018/0156623 | A1 | 6/2018 | West |
| 2018/0158325 | A1 | 6/2018 | Bernhardt |
| 2018/0189918 | A1 | 7/2018 | Lu |
| 2018/0202820 | A1 | 7/2018 | Yu |
| 2018/0202821 | A1 | 7/2018 | Yu |
| 2018/0342035 | A1 | 11/2018 | Sweeney |
| 2018/0356239 | A1 | 12/2018 | Marco |
| 2018/0374032 | A1 | 12/2018 | Pan |
| 2019/0137288 | A1 | 5/2019 | Rahematpura |
| 2019/0306258 | A1 | 10/2019 | Yamashita |
| 2020/0160709 | A1 | 5/2020 | Ramot |
| 2020/0249042 | A1 | 8/2020 | Warr |
| 2020/0292335 | A1 | 9/2020 | Rahematpura |
| 2021/0209520 | A1 | 7/2021 | Sarawgi |
| 2021/0285783 | A1 | 9/2021 | Warr |

FOREIGN PATENT DOCUMENTS

| | | |
|---|---|---|
| JP | 2010-208195 | 8/1998 |
| JP | 3934985 | 6/2007 |
| JP | 2012-73995 | 4/2012 |
| JP | 2004-073639 | 5/2015 |
| WO | WO 2002006994 | 1/2002 |
| WO | WO 2011069170 | 6/2011 |
| WO | WO 2014074407 | 5/2014 |
| WO | WO-2014106617 | 7/2014 |
| WO | WO 2018132715 | 7/2018 |

OTHER PUBLICATIONS

International Search Report in PCT/US2015/043654 dated Nov. 26, 2015.
IPRP in PCT/US2015/043654 dated Feb. 16, 2017.
International Search Report in PCT/US2016/066030 dated Feb. 28, 2017.
Written Opinion in SG 11201700671P dated Oct. 13, 2017.
EESR in EP 15830335.4 dated Nov. 29, 2017.
IPRP in PCT/US2016/066030 dated Jun. 21, 2018.
2nd Written Opinion in SG 11201700671P dated Aug. 29, 2018.
ESER in EP 16874019.9 dated Aug. 22, 2018.
ISR and Written Opinion in PCT/US2018/013583 dated Apr. 20, 2018.
ISR and Written Opinion in PCT/US2018/059230 dated Jan. 2, 2019.
Andrew J. Hawkins, Lyft is now suggesting more convenient pickup locations, because a little walking won't kill you. Jun. 26, 2017 The Verge (www.theverge.com).
Office Action in EP 15830335.4 dated Mar. 21, 2019.
Office Action in JP 2017-505856 dated Feb. 6, 2019.
Mark H. Walker, "Microsoft Office Visio 2003 Official Manual", Initial Pressing Nikkei BP Soft Press, Apr. 4, 2005, First Edition, pp. 423-425.

(56) References Cited

OTHER PUBLICATIONS

ISR dated Oct. 3, 2018 in PCT/US2018/039830.
Borison, Rebecca, "Uber Brings its SUV Fleet to NYC", Jul. 30, 2014, Business Insider, p. 1.
Hilen, Brittany, Uber and Google bring WIFI to cars in Philadelphia, Slashgear, dated Jul. 24, 2014, p. 1, https://web.archive.org/web/20140724201314/https://www.slashgear.com/uber-and-google-bring-wifi-to-cars-in-philadelphia-22338326.
Jain, "Contextual Adaptive User Interface for Android Devices", Annual IEEE India Conference (INDICON), IEEE, pp. 1-4 (2013).
IPRP in PCT/US2019/039830 dated Jun. 26, 2019.
Pelzer, et al., "A Partition-Based Match Making Algorithm for Dynamic Ridesharing", IEEE Transactions on Intelligent Transportation Systems, vol. 16, Issue: 5, pp. 2587-2596 (2015).
Office Action in EP 15830335.4 dared Nov. 21, 2019.
First Office Action in CN 201580043970 dated Apr. 22, 2020.
Pre-Examination Office Action in BR 112017002174-9 dated Jun. 6, 2020.
Examination Report No. 1 for AU 2015301178 dated Jun. 11, 2020.
Office Action in EP 16874019.9 dated Jun. 9, 2020.
Pre-Exam Office Action in BR 112018011694-7 dated Jul. 13, 2020.
Exam Report No. 1 in AU 2018207620 dated Apr. 6, 2021.

METHOD AND SYSTEM FOR REPOSITIONING A SERVICE LOCATION

CROSS-REFERENCE TO RELATED APPLICATIONS

This application is a continuation of U.S. patent application Ser. No. 15/671,062 filed Aug. 7, 2017, which claims benefit of priority to U.S. Provisional Patent Application No. 62/446,292 filed Jan. 13, 2017, the aforementioned priority applications being hereby incorporated by reference in their respective entireties.

BACKGROUND

A network system can receive, from user devices, service requests for one or more network services. The service request can include data related to a service location (e.g., a service initialization location) that the service provider is to travel to, to provide the requested service. The network system can provide to the service provider routing information to the location.

Figure 1:
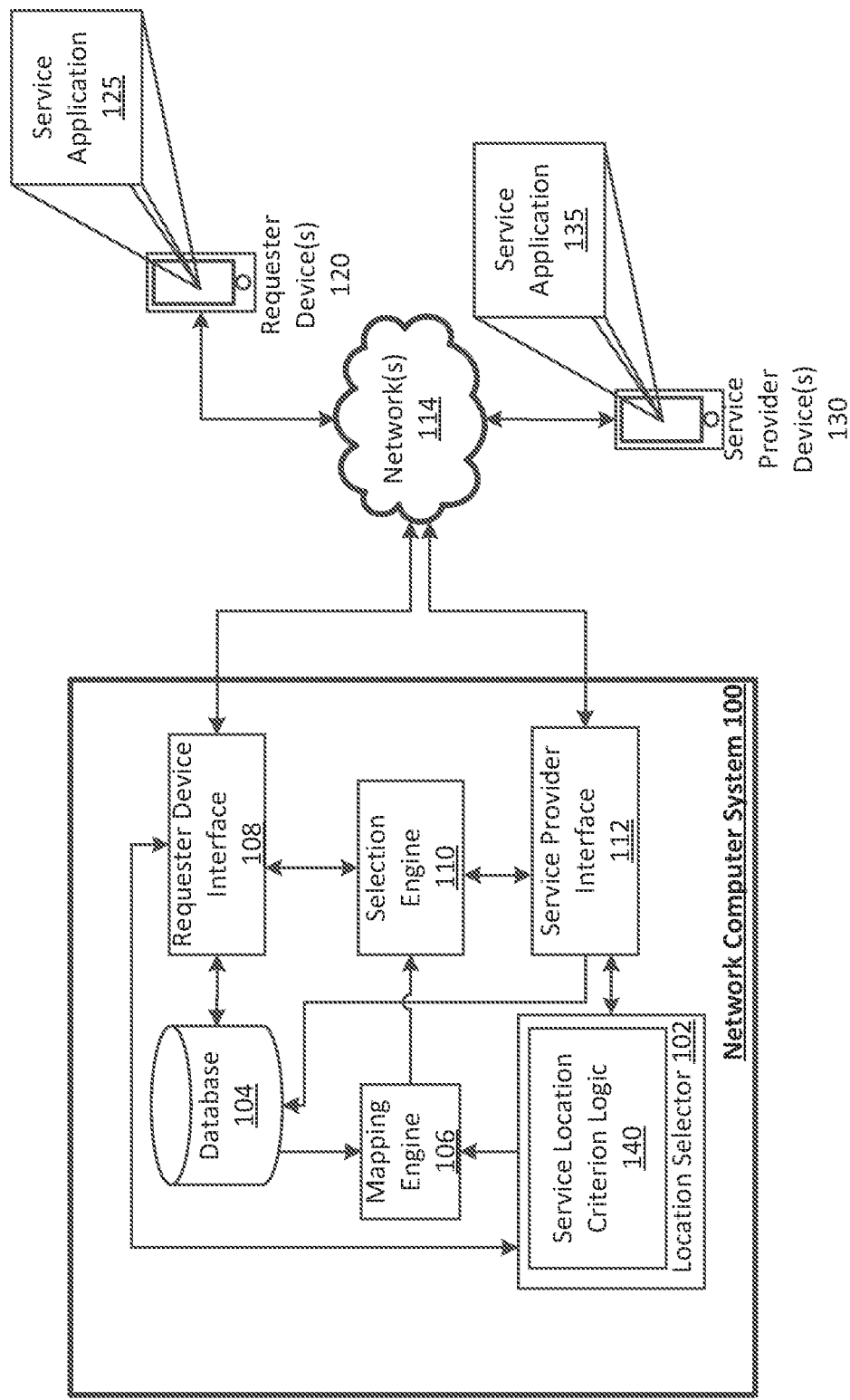
FIG. 1 illustrates an example network computer system in communication with requester device(s) and provider device(s)

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a network computer system to implement an on-demand service in which a service requester (e.g., a rider) or service provider (e.g., a driver) is permitted to change a service location (e.g., a service initialization location such as an initial pickup location) of a service request to an alternative location, if the alternative location satisfies a predetermined permissibility criterion. A predetermined permissibility criterion is a rule or condition for avoiding detrimental impact to the service requester, the service provider, and/or the service request. For example, a predetermined permissibility criterion may indicate that selecting an alternative pickup location can be selected if it results in an overall lower predicted or estimated service cost of the transport service.

According to an aspect, a service requester (e.g., a rider) can make a service request to receive transport at an initial pickup location. Thereafter, the service requester can then perform some action that signals the service requester's intent to have the transport service initiate from a different pickup location. Consider an example situation where the service requester accidentally sets the initial pickup location to be at a street at the back of their home, but would rather have the pickup location be at the street in front of their home. In such an example, the service requester can perform some action that signals the service requester's intent to have the transport service initiate from the street in front of their home. In some examples, the action can be explicit, such as the service requester entering input on a user-interface to select a new or alternative pickup location (e.g., the user-interface input may be the specification of a request to change the service location, or the explicit specification of the alternative location itself). In other examples, the service requester's intent can be inferred by detecting a user action using, for example, location data transmitted from the mobile device of the service requester. For example, the mobile device of the user may transmit location data to the network computer system that indicates the service requester is walking away from the initial pickup location. In such examples, the inferred action (e.g., user walking away from the original pickup location) can trigger the network computer system to change the initial pickup location to an alternative pickup location, coinciding with the service requester's changed location. In a variation, the network computer system can send a set of recommended alternative pickup locations to the service requester for selection, in response to the network computer system detecting a user action (e.g., explicit or implicit) to change the pickup location.

If the user's intent to select the alternative pickup location is detected after the service request is matched (e.g., after a service provider is selected to fulfil the service request, and the service provider is on-route to the initial pickup location to pick up the service requester), the network computer system determines whether the new or alternative pickup location satisfies a predetermined permissibility criterion. If the predetermined permissibility criterion is satisfied, some examples provide that the network computer system automatically implements changes to facilitate completion of the service request using the new pickup location. For example, the computer system may instruct the service provider and/or service requester to arrive at the new pickup location. If the predetermined permissibility criterion is not satisfied, some variations provide that the service requester is denied the ability to change the service location of the service request. In such examples, the service requester may be required to cancel the service request all together.

In some implementations, the service requester and/or service provider may be informed of changes to service parameters, such as a change in fare, because of the change in the service location of the service request. According to such examples, the predetermined permissibility criterion may be based on a predicted change to one or more service parameters, such as service fulfilment duration (e.g., a duration of time interval remaining until a service requester arrives at a specified destination of the service request), overall service duration (e.g., amount of total time between the current location of the service provider to the new pickup location, if permitted, and to the specified destination of the service request), actual or estimated service distance (e.g., distance from pickup location to the specified destination of the service request), estimated service initialization time (e.g., arrival time at the pickup location or the start of the service request), estimated service completion time (e.g., the predicted time of arrival at the specified destination of the service request), and/or service costs (e.g., the predicted fare of the transport service).

According to another aspect, a service provider can request or perform some action that indicates the service provider's desire to change a service location (e.g., the original pickup location) of a service request which the service provider is matched to. For example, a service provider may notice that the current original pickup location is in the middle of a heavily congested area, and the service provider may want to reposition or change the service location of the service request to a less congested area close to the original pickup location. In some examples, a network computer system can detect an action (or series of actions) of the service provider to enable pickup of the service requester at an alternative location that is near but not the same as the pickup location. In some examples, the action can be explicit, such as service provider entering input on a user-interface that is generated for the on-demand service on the mobile device of the service provider (e.g., the user-interface input may be the specification of a request to change the service location, or the explicit specification of the alternative location itself). In other examples, the action can be inferred, such as location data of the mobile device of the service provider indicating that the service provider is moving away from the initial pickup location. The network computer system can evaluate the suitability of the alternative location for picking up the service requester, based on whether the change in resulting service parameters satisfies one or more predetermined permissibility criterion (e.g., rules pertaining to walking distance/time for the service requester to travel to the alternative pickup location, changes to trip completion time, etc.). If the predetermined permissibility criterion is satisfied, some examples provide that the network computer system automatically implements changes to facilitate completion of the service request using the alternative pickup location. For example, the computer system may instruct the service provider and/or service requester to arrive at the new pickup location. If the predetermined permissibility criterion is not satisfied, some variations provide that the service provider is denied the ability to change the service location of the service request. In some implementations, the service requester and/or service provider may be informed of changes to service parameters, such as a change in fare, because of the change in the service location of the service request.

Many examples are described below in the context of transportation services, wherein a first user can request a transportation service from a second user. However, it will be appreciated that the network computing system can provide other services, such as delivery of items (e.g., food items and products) or any suitable service, in other examples.

As provided herein, the terms "user," "requester" and "service requester" are used throughout this application interchangeably to describe a person or group of people who utilize a requester application on a computing device to request, over one or more networks, on-demand services from a network computing system. The term "service provider" is used to describe a person utilizing a provider application on a computing device to provide on-demand services to the service requesters.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, on or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1 illustrates an example network computer system in communication with requester device(s) and provider device(s). Network computer system 100 can implement or manage a transport-related service, such as an on-demand service to transport a requester from a service start (or pickup location) to a destination location. In some examples, network computer system 100 can match service requests generated from requesters operating requester devices (represented in FIG. 1 by requester device 120) with service providers, operating provider devices (represented in FIG. 1 by service provider device 130), who transport the requesters using a corresponding service vehicle.

Network computer system 100 can enable network services to be requested by the users of requester device(s) 120 and provided by available service providers associated with service provider device(s) 130. As shown by an example of FIG. 1, network computer system 100 communicates with a service application 125 running on a requester device 120 to provide functionality for the user to generate service requests and to receive transport services. Additionally, network computer system 100 communicates with a service application 135 running on the service provider device 130 to provide functionality to match the service provider with service requests generated from the requester devices. Requester device(s) 120 and service provider device(s) 130 can comprise mobile computing devices with functionality to execute service application 125 and service application 135, respectively. Examples of mobile computing devices include smartphones, tablet computers, virtual reality or augmented reality headsets, on-board computing systems of vehicles, etc.

Network computer system 100 can include one or more communication interfaces to communicate with requester device(s) 120 and/or service provider device(s) 130 over network(s) 114. For example, as illustrated in FIG. 1, network computer system 100 can include requester device interface 108 to communicate over network(s) 114 with the service application 125 running on requester device(s) 120. Additionally, the network computer system 100 can include service provider interface 112 to communicate over network(s) 114 with service application 135 running on provider device(s) 130.

A service request can include a network service type (e.g., delivery of food or products, transportation arrangement services, etc.), user-configurable service parameters (e.g., the number of seats requested for a car pool transport request, scheduling information, etc.), and identification information for a user of requester device 120. The service request can include data related to one or more service locations. For example, the service request can include a service location that is associated with a service initialization location (e.g., a pickup location for a transport service request) a service provider is to travel to, to render the service. In other examples, the service request can include a service location that is associated with a final service location (e.g., a destination location) a service provider is to travel to, to complete the service. Examples of service locations include a latitude and longitude coordinate, a geographical area, a POI (point of interest), etc. Examples of a POI include a building, a corner of a street intersection, and a section of a street.

Network computer system 100 can include location selector 102 to restrict or authorize a change in a service location of a service request that has been assigned to a service provider. Location selector 102 can restrict or authorize a change in a service location to a new or alternative service location (e.g., a second service location) based on whether the alternative service location satisfies the predetermined permissibility criterion (e.g., location selector 102 can authorize the change if the alternative service location satisfies a predetermined permissibility criterion or restrict or prevent the change if the alternative service location does not satisfy the predetermined permissibility criterion). Location selector 102 can utilize service location criterion logic 140 to determine whether the alternative service location satisfies a predetermined permissibility criterion of the service request.

In some examples, the predetermined permissibility criterion can be based on a comparison of service parameters (e.g., service cost, service initialization time, service completion time, service duration, etc.) of the original service location of the service request and the alternative service location. For example, a predetermined permissibility criterion may indicate that an estimated service initialization time of the alternative pickup location cannot be later than the estimated service initialization time of the original pickup location of the service request. In such examples, service location criterion logic 140 can compare the estimated service initialization time of the original pickup location to the estimated service initialization time of the alternative pickup location, and determine whether the estimated service initialization time of the alternative pickup location is not later than the estimated service initialization time of the original pickup location of the service request (in accordance with the predetermined permissibility criterion). Other examples of service parameters can include service fulfilment duration (e.g., duration of interval remaining until requester arrives at a specified destination of the service request), overall service duration (e.g., amount of total time between the current location of the service provider to the new pickup location, if permitted, and to the specified destination of the service request), service distance (e.g., distance from pickup location to the specified destination of the service request), estimated service initialization time (e.g., arrival time at the pickup location or the start of the service request), estimated service completion time (e.g., the predicted time of arrival at the specified destination of the service request), and/or service costs (e.g., the predicted fare of the transport service).

Network computer system 100 can transmit to a user device (e.g., requester device(s) 120 and/or service provider device(s) 130) an instruction to associate a service request with a second service location that satisfies a predetermined permissibility criterion in place of an original service location of the service request. In some implementations, network computer system 100 can transmit the instruction to a user device (e.g., service provider device 130 and/or requester device 120) in response to determining that the second service location satisfies a predetermined permissibility criterion of the service request.

In some implementations, network computer system 100 can change the service location of a service request upon determining that a service parameter (e.g., the cost, the service initialization time, or service completion time, etc.) of an alternative service request satisfies a predetermined criterion value of a predetermined permissibility criterion. For example, a predetermined permissibility criterion specifies that an initial service location of a service request can be changed to an alternative service location, if the service cost of the alternative service location is at least 10% lower than the service cost of the initial service location. Thus, the aforementioned predetermined criterion value may correspond to a minimum threshold percentage change or delta in the value of a service parameter for the alternative service location (as compared to the value of that service parameter for the original service location).

Network computer service 100 can constrain or limit when a service request can be associated with an alternative service location in place of an original service location of the service request. In some examples, the limitation can be based on a proximity distance threshold of the original service location of the service request. For example, network service 100 can associate the service request with the alternative service location, if the alternative service location is within a proximity distance threshold to the original service location. In another example, network computer system 100 can transmit instructions to service application 125 and/or service application 135 to restrict a user input (e.g., a user input of requester device 120 and/or a user input of service provider device 130) from changing the service location to a second or alternative service location outside a proximity distance threshold of the first or original service location. Additionally, in such an example, the instruction from network computer system 100 can also enable a user input to change the service location to an alternative service location within the proximity distance threshold of the first or original service location. Other examples of limitations include frequency (e.g. a number of times the user of requester device 120 or service provider associated with provider device 130 can change the service location), and a time period (e.g. a grace period or a time limit) after the service request has been transmitted to or accepted by the service provider when the user of requester device 120 or service provider associated with provider device 130 can change the service location.

In some implementations, network computer system 100 can automatically transmit an instruction to a device (e.g., requester device 120 and/or service provider device 130) to associate a service request with an alternative service location in place of an original service location of a service request. In some examples, network computer system 100 can automatically transmit the instruction based on location selector 102 determining that an alternative service location satisfies a predetermined permissibility criterion of the service request. In such examples, in some implementations, determining the new service location satisfies a predetermined permissibility criterion can be based on sensor data and/or location data of service provider device 130 and/or requester device 120. In other examples, network computer system 100 can transmit the instruction to a device (e.g., service provider device 130 and/or requester device 120) upon determining that the service provider is in the process of fulfilling the service request (e.g., the service provider has accepted the service request). For example, network computer system 100 can determine from location data from a location based resource of service provider device 130 that the corresponding service provider is traveling towards the original service location of the service request. In response to such a determination, network computer system 100 can transmit the instruction to the service provider device 130 and/or requester device 120. Network computer system 100 can thus enable the service location of the service request to be changed, even when the service provider is already en route to the initial service location. Thus, the service requester may be provided some flexibility to change the service location when, for example, the initial service location was made in error or when circumstances make the initial service location inconvenient. As described with other examples, network computer system 100 can implement controls to restrict the ability of the service requester to change the initial service location to avoid, for example, added hardship or cost to the service provider. As such, the added flexibility provided to the service requester does not cause undue hardship to the service provider.

Network computer system 100 can intelligently recommend a set of alternative locations for a user (e.g., a user of requester device 120 or service provider associated with provider device 130) to select. For example, network computer system 100 can identify locations within a proximity distance threshold of the initial service location (e.g., the initial pickup location of the service request) and check whether each location satisfies at least one predetermined permissibility criteria of the service request. In other variations, network computer system 100 can filter out and highlight service locations that are commonly selected, based on historical data of previously submitted service requests and/or requests to change the service location of a service request. In some examples, network computer system 100 can filter out and highlight service locations that have been previously identified as safe for picking up a service requester (e.g., based on mapping data from mapping engine 106, the service location is located next to a sidewalk and not on the highway). In other examples, network computer system 100 can filter out and highlight locations that are convenient for a service provider (e.g. based on real-time traffic data, network computer system 100 can determine one intersection maybe more convenient for a service provider to pick up a service requester than another intersection. Examples of an alternative service location include a latitude and longitude coordinate, a geographical area, a POI, etc. Examples of a POI include a building, a corner of a street intersection, and a section of a street.

Additionally, in some examples, network computer system 100 can provide an instruction to a device (e.g., requester device 120 and/or service provider device 130) to restrict a user's input (e.g., from the user of requester device 120 and/or the service provider associated with provider device 130) so that the user can only change the service location of the service request to one of the alternative service locations from the recommended set of alternative locations. In examples where an alternative location is a geographic area, network computer system 100 can limit a user input so that the user can only change the service location to a location within the geographic area. In other examples, network computer system 100 can identify an alternative location or a set of alternative locations for a user (e.g., a user of requester device 120 or a service provider associated with provider device 130) to select, upon detecting a user's input to initiate associating the service request with another service location before the user explicitly specifies an alternative service location. For instance, a user (e.g., a service provider or service requester) can transmit a request to network computer system 100 to change the pickup location of an open service request by simply selecting, for example, a "change service location" graphical user interface element presented by service application 125/135. In such an instance, the user has not yet explicitly specified an alternative service location, and thus the service request transmitted to the network computer system 100 does not include a user-specified alternative service location. Accordingly, network computer system 100 can identify or recommend an alternative location or a set of alternative locations to the user via service application 125/135, and the user may select a recommended alternative location to change the pickup location of the service request to the selected alternative location.

Network computer system 100 can include database 104. Database 104 can store a variety of data from requester device(s) 120 and service provider device(s) 130. For example, database 104 can store status data from service provider device(s) 130 and/or requestor device(s) 120. In some examples, status data includes location data of a requestor device(s) 120 and/or service provider device(s) 130. Service provider device 130 and requester device 120 can transmit location data from location based resources (e.g., global positioning system (GPS) resources) included in service provider device 130 and requester device 120, respectively. In some examples, service provider 130 and requester device 120 can periodically transmit location data to database 104 to update the location of service provider device 130 and requester device 120, respectively. Examples of other status data include steps of network services already performed (e.g., a delivery item has been picked up), steps of network services currently being performed (e.g., a delivery item is being picked up), and steps of network services to be performed (e.g., a delivery item is to be picked up).

Location selector 102 can utilize sensor data in determining whether a service location satisfies a predetermined permissibility criterion of a service request. In some examples, sensor data can include real-time traffic data from a third-party provider. In other examples, sensor data can include real-time weather data from a third-party provider. In yet other examples, sensor data can include real-time traffic data derived/determined from environmental data from one or more vehicles of one or more service providers. In some examples, the one or more vehicles are one or more autonomous vehicles. The environmental data from the vehicle can be from one or more sensors operatively connected to a corresponding service provider vehicle. Each sensor can detect data of the environment surrounding a corresponding vehicle (e.g., speed of the vehicle, the average speed of the vehicle, number of objects (e.g. cars, motorcycles, cyclists) around the vehicle at a given timeframe, how far an object is from the vehicle, the speed of each object around the vehicle, the location of each vehicle, etc.). In such implementations, the environmental data from a vehicle can be processed by location selector 102 to determine real-time traffic data. In other examples, a service provider can transmit environmental data (e.g. road closures, heavy traffic, etc.) through service application 135 to network computer system 100. Additionally, the environmental data from each vehicle and the derived real-time traffic data can be stored in location selector 102.

In some examples, location selector 102 can utilize sensor data and location data of service provider device 130 and/or requester device 120 in determining environmental data about a particular vehicle (e.g., the service provider) in a particular area. In some examples, the environmental data of the vehicle can include the speed of the vehicle, the location of the vehicle, the speed of an object near the vehicle, and the location of the object relative to the vehicle. Additionally, in some examples, location selector 102 can derive real-time traffic data from the environmental data. For example, the environmental data can indicate that the vehicle is traveling at 45 mph, with an object (e.g. car/motorcycle/cyclist) 5 feet from the right side of the vehicle that is traveling at 40 mph. As such, the location selector 102 can determine that the current traffic is light for that particular vehicle because both the vehicle and the object are traveling at relatively fast rates (45 mph and 40 mph respectively). Additionally, the location selector 102 can utilize the current location of service provider device 130 to also determine that the current traffic is light for that particular vehicle in that particular area. In some implementations, location selector 102 can receive environmental data of multiple regions or areas from multiple vehicles (e.g., multiple service provider devices 130).

In some implementations, location selector 102 can utilize location data of the service provider (e.g., from location based resources of a corresponding service provider device 130) and the above described sensor data, environmental data, and/or derived real-time traffic data when determining whether to authorize or restrict a change in the service location of the service request. For example, location selector 102 can derive real time traffic data from environmental data from one or more vehicles (e.g., service providers) of region A. Additionally, suppose location selector 102 determines that the current location of a service provider is within region A and that the service provider is traveling towards a specified service location (e.g., pick-up location) of a matched service request. If the service requester of the matched service request sends a request to change the service location of the matched service request to an alternative service location, then location selector 102 determines whether the alternative location would satisfy a predetermined permissibility criterion (e.g., a rule stating that the service initialization time of the alternative service location cannot be later than the service initialization time associated with the original service location of the service request) before authorizing or restricting the change, based on the derived real time traffic data and the current location of the service provider of the matched service request. For example, if location selector 102 determines that the alternative location is in a highly congested area within region A that would result in the service provider taking longer to pick up the service requester (e.g., resulting in a later service initialization time) than it would with the original service location, the location selector 102 can restrict the changing of the service location of the matched service request to the alternative service location. However, if location selector 102 determines that the alternative location would result in an earlier pick up time (e.g., earlier service initialization time) than it would with the original service location (e.g., if location selector 102 determines that the original service location is in a highly congest area within region A), then location selector 102 can authorize the change in service location to the alternative service location.

Network computer system 100 can include a mapping engine 106. Mapping engine 106 can utilize a third-party mapping services to generate map data of the environment surrounding one or more service locations of a service request on a map interface of service application 125/135. Additionally, mapping engine 106 can receive location data from one or more service provider vehicles. The location data can be graphically represented on the map interface of service application 125/135 to represent the current location and the movements of a corresponding service provider vehicle. In some examples, mapping engine 106 can receive real-time traffic data from a third-party provider. Additionally, mapping engine 106 can transmit the real-time traffic data of a third-party provider to location selector 102. In other examples, mapping engine 106 can transmit historical traffic data (e.g. speed limits, historical traffic conditions for one or more regions during one or more timeframes, etc.) and road laws data stored in database 104 to location selector 102. In some implementations, historical traffic data and road laws data can be utilized by location selector 102 when determining real-time traffic data from the environmental data.

Network computer system 100 can include selection engine 110. Selection engine 110 can process a service request from requester device(s) 120 to select a candidate service provider of service provider device 130 to fulfill the service request. For example, selection engine 110 can use the location data of service provider device(s) 130 to select a candidate service provider to fulfill the service request from requester device 120. In some examples, selection of a candidate service provider can be based on the proximity of each service provider device 130 of the corresponding candidate service provider to the requester device 120 of the service request. In other examples, selection of a service provider can be based on the estimated service initialization time (e.g., the service provider that can start the service request the soonest). In yet other examples, selection of a service provider can be based on the experience, customer/requester feedback and ratings, duration of time working, current earnings, etc., of the service provider.

Selection engine 110 can transmit a service invitation to service provider device 130 in response to selection engine 110 selecting an available service provider to fulfill the service request. In some examples, network computer system 100 can transmit user account information of the service requester associated with the service request to each service provider device 130 of each corresponding candidate service provider. Examples of user account information of the requester (e.g., user of requester device 120) include a name and a photograph of the user associated with service request. In some examples, the user account information can be stored in database 104.

A candidate service provider can accept, reject, or cancel the service invitation after receiving the service invitation. If the candidate service provider accepts the service invitation, network computing system 100 can assign the candidate service provider to the service request. Additionally, in some examples, in response to the candidate service provider accepting the service invitation, network computer system 100 can transmit a confirmation of that acceptance to requester device 120. If the candidate service provider rejects or cancels the service invitation, network computing system 100 can determine and select another candidate service provider to fulfill the service request.

Network computer system 100 can provide application data to requester device(s) 120 and/or service provider device(s) 130 to execute. For example, service application 125 and 135 can execute the application data from network computer system 100. In some examples, a service application (e.g., service application 125 and/or service application 135) can include a map interface. In such examples, the service application (e.g., service application 125 and/or service application 135) can also execute the application data to generate a graphical representation of a service location of the service request on the map interface. Furthermore, in some examples, the application data can include data for highlighting the graphical representation of the service location.

In some implementations, network computer system 100 can transmit magnification instructions to be executed by the service application (e.g., service application 125 and/or service application 135) to magnify at least a portion of the map interface. In some examples, network computer system 100 can determine that service provider device 130 is within a predetermined proximity threshold to the original service location of the service request. As such, network computer system 100 can transmit magnification instructions and application data to the service application 125/135, in response to such a determination. The application data, when executed by the service application 125/135, can cause the service application 125/135 to generate a graphical representation of a location of provider device 130 and a graphical representation of a service location of a service request. The magnification instructions, when executed by the service application 125/135, can cause the service application 125/135 to magnify at least a portion of the map interface that can include the graphical representation of the location of provider device 130 and a graphical representation of the service location. In some examples, the magnification instruction causes the service application (e.g., service application 125 and/or service application 135) to magnify a predetermined area around the graphical representation of the service location. In other examples, the predetermined area around the graphical representation of the service location includes the graphical representation of the location of provider device 130.

Figure 2A:
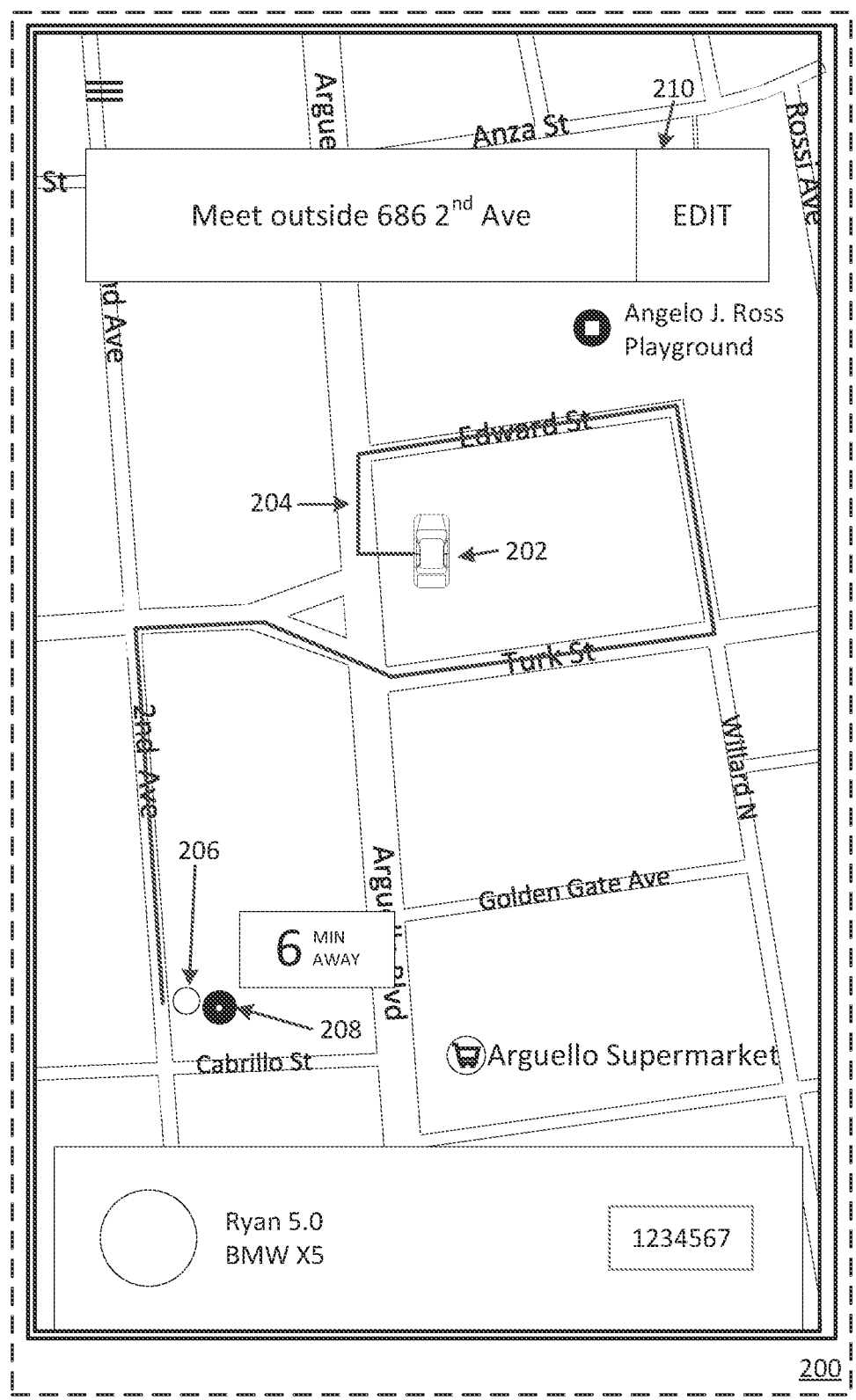
FIG. 2A illustrates an example map user interface (UI) that can display a service provider being routed from a current location of the service provider to an original service location of a service request.
Figure 2B:
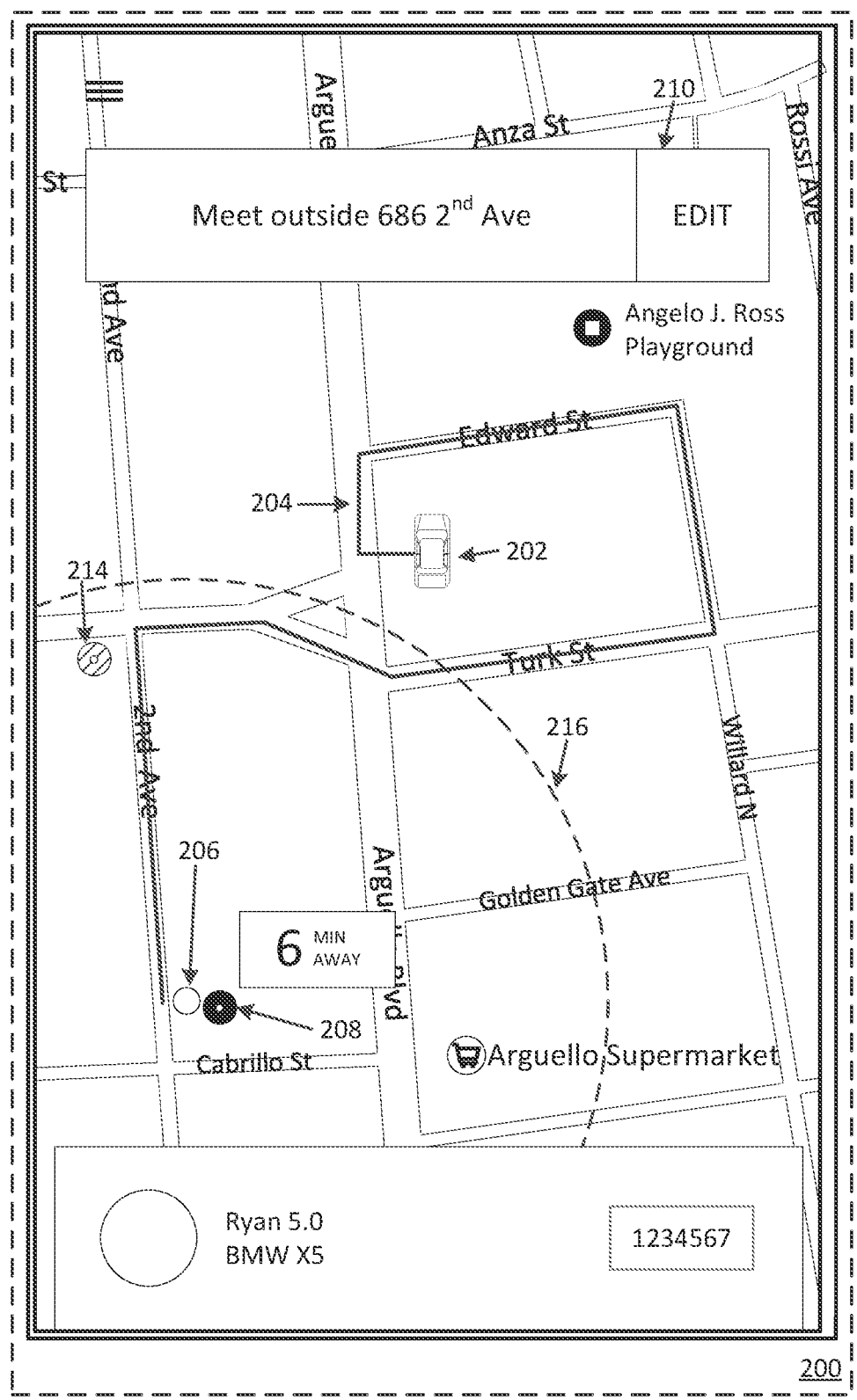
FIG. 2B illustrates an example map UI that can display the change in the service location of the service request from an original service location to an alternative service location.
Figure 2C:
FIG. 2C illustrates an example map UI that can display an updated route of the service provider if the alternative service location is authorized by the network computer system.

An instruction to associate a service request with an alternative service location in place of an original service location of the service request can be reflected on a map interface executed on a service application (e.g., service application 125/135). In some examples, a user of a requester device 120 or a service provider associated with a provider device 130 may want to change a service location of a service request that the user of requester device 120 had already transmitted (e.g., thereby causing a repositioning event). For example, a user may accidentally set their pickup location on a street at the rear of the property instead of the front, and would like to change the pickup location to a street at the front of the property. In other examples, the service provider may realize, while driving to the service location, that the service location included in the service request is in a heavily congested area. In such examples, the service provider may want to reposition the pickup location to a less congested area close to the original pickup location. FIGS. 2A, 2B and 2C illustrate an example repositioning event, on a map interface executed on a service application (e.g., service application 125/135). FIG. 2A illustrates an example map UI 200 that can display a service provider being routed from a current location of the service provider to an original service location of a service request on map UI 200. For example, map UI 200 can display service provider graphic 202 that corresponds to the current location of the service provider and first service location graphic 208 that corresponds to the original service location. Additionally, map UI 200 can display original route 204 that corresponds to a route between the current location of the service provider (represented by to service provider graphic 202) to the original service location (represented by to first service location graphic 208). Moreover, map UI 200 can display the current location of the service requester as service requester graphic 206. In some examples, the original service location of the service request corresponds to a service initialization location (e.g., a pickup location for a transportation service request).

Map UI 200 can be executed by a service application (e.g., service application 125 and/or service application 135) on a mobile computing device (e.g., requester device 120 and/or service provider device 130). In some implementations, a network computer service can provide application data to generate and update the map interface of UI 200 (e.g., map data from mapping engine 106). Routing data can be received from a network computer system (e.g. mapping engine 106). Location data can be provided by the service provider device corresponding to service provider graphic 202 (e.g. service provider device 130). Service location data (e.g. the original service location) can be provided by the network computer system (e.g., network computer system 100) or directly retrieved from a service request. Application data to generate original route 204, service provider graphic 202, service requester graphic 206, and first service location graphic 208 can be provided by a network computer system. The real-time location of the service provider can be displayed on map UI 200 by displaying the corresponding movement of service provider graphic 202 on map UI 200. Location data corresponding to the movement of the service provider can be periodically received from a service provider device (via a network computer system) and generated or reflected on map UI 200 by the service application.

A change in a service location of a service request can be reflected on map UI 200. For example, FIG. 2B illustrates an example map UI 200 that can display the change in the service location of the service request from an original service location to an alternative service location. In some examples, a user (e.g., service requester or service provider) may initiate the change of the service location of the service request by interacting with a graphical representation provided by map UI 200 (e.g., EDIT button 210 in FIG. 2A).

In some implementations, the network computer service (e.g., the network computer service 100) can limit where the new or alternative service location can be changed to. Additionally, the network computer system can transmit application data to a service application (e.g., service application 125 and/or service application 135) and cause the service application to generate and display such limits on map UI 200. For example, as illustrated in FIG. 2B, map UI 200 can include boundary graphic 216 that represents an area where a user input (e.g., a user input of requester device 120 and/or a user input of service provider device 130) can change the new or alternative service location of the service request to. For example, a user (e.g., service provider or service requester) can move first service location graphic 208 (e.g., moving and dropping a pin graphical representation of the original service location) or change the address of the original service location of the service request to any area within boundary graphic 216 (e.g., resulting in the alternative service location represented by second service location graphic 214). Additionally, the areas outside the boundary graphic 216 can represent areas that a user cannot change the service location to. For example, a user cannot move first service location graphic 208 or change the address corresponding to the first service location graphic 208 to an area outside of boundary graphic 216. In some implementations, as illustrated in FIG. 2B, boundary graphic 216 can be circular radius boundary with the first service graphic 208 in the middle of boundary graphic 216. In other implementations, boundary graphic 216 can be any type of shape (e.g., a semi-circle, an oval, a polygonal shape, an L-shape, a square, a hexagonal shape, etc.).

In some examples, the area of boundary graphic 216 can represent or correspond to a predetermined proximity threshold of the first or original service location (e.g., a 1 block radius from the first service location). In other examples, the area of boundary graphic 216 represents or corresponds to an area within which an alternative service location can satisfy a predetermined permissibility criterion described herein (e.g., rules pertaining to the alternative service location having an equal or lower predicted service cost, predicted service completion time, predicted service initialization time, etc., in comparison to the original service location). In such examples, the area outside of boundary graphic 216 represents an area in which an alternative service location cannot satisfy the predetermined permissibility criterion. In yet other examples, although not illustrated in FIG. 2B, the network computer system 100 can determine one or more suggested or recommended alternative service locations (as described earlier) and display them on the map UI 200, such that a user can select one of the suggested or recommended alternative service locations, to thereby change the original service location of the service request to the selected alternative service location.

In some implementations, the network computer system (e.g., network computer system 100) can utilize sensor data (as discussed earlier) to determine areas where potential alternative service locations within such areas can or cannot satisfy a predetermined permissibility criterion of the service request described herein (e.g., rules pertaining to the alternative service location having an equal or lower predicted service cost, predicted service completion time, predicted service initialization time, etc., in comparison to the original service location). Additionally, the network computer system can show such areas on map UI 200. For example, referring to FIG. 2B, the network computer system can determine that a portion of Golden Gate Avenue currently has highly congested traffic conditions. As such, the network computer system can send application data to the service application (e.g., service application 125/135) to restrict a user input from changing the service location to an alternative service location that is on a portion of Golden Gate Avenue between Arguello Boulevard and Willard North Street. Additionally, the network computer system can send application data to the service application (e.g., service application 125/135) to show, on map UI 200, a graphical representation of areas that a user cannot change the service location of the service request to (e.g., a highly-congested portion of Golden Gate Avenue between Arguello Boulevard and Willard North Street). In some implementations, the graphical representations of the restricted areas can be highlighted (e.g., with a specific color or shading) on map UI 200. In examples where the restricted areas are within a graphical representation of a boundary (e.g., boundary graphic 216), the graphical representation of the boundary can wrap around or exclude the restricted areas, and/or be highlighted.

FIG. 2C illustrates an example map UI 200 that can display an updated route of the service provider if the alternative service location is authorized by the network computer system (e.g., network computer system 100). As discussed previously, a network computer system (e.g. network computer system 100) can restrict or authorize a change in a service location based on whether the new or alternative service location satisfies a predetermined permissibility criterion. As illustrated in FIG. 2C, the alternative service location is represented by second service location graphic 214. FIG. 2C also illustrates an updated route 212. Updated route 212 corresponds to the new route between the current location of the service provider (e.g. service provider graphic 202) and the alternative service location (second service location graphic 214). Routing data and application data to generate updated route 212 can be received from a network computer system (e.g. mapping engine 106).

In some implementations, map UI 200 can indicate that an alternative service location satisfies a predetermined permissibility criterion of a service request better than an original service location of the service request. For example, as illustrated in FIGS. 2A and 2C, map UI 200 can present the differing service initialization times associated with the original service location and the alternative service location. As illustrated in FIGS. 2A and 2C, the service initialization time for the original service location (represented by first service location graphic 208) is 6 min, while, as illustrated in FIG. 2C, the service initialization time for the alternative service location (represented by second service location graphic 214) is 4 minutes.

Figure 3:
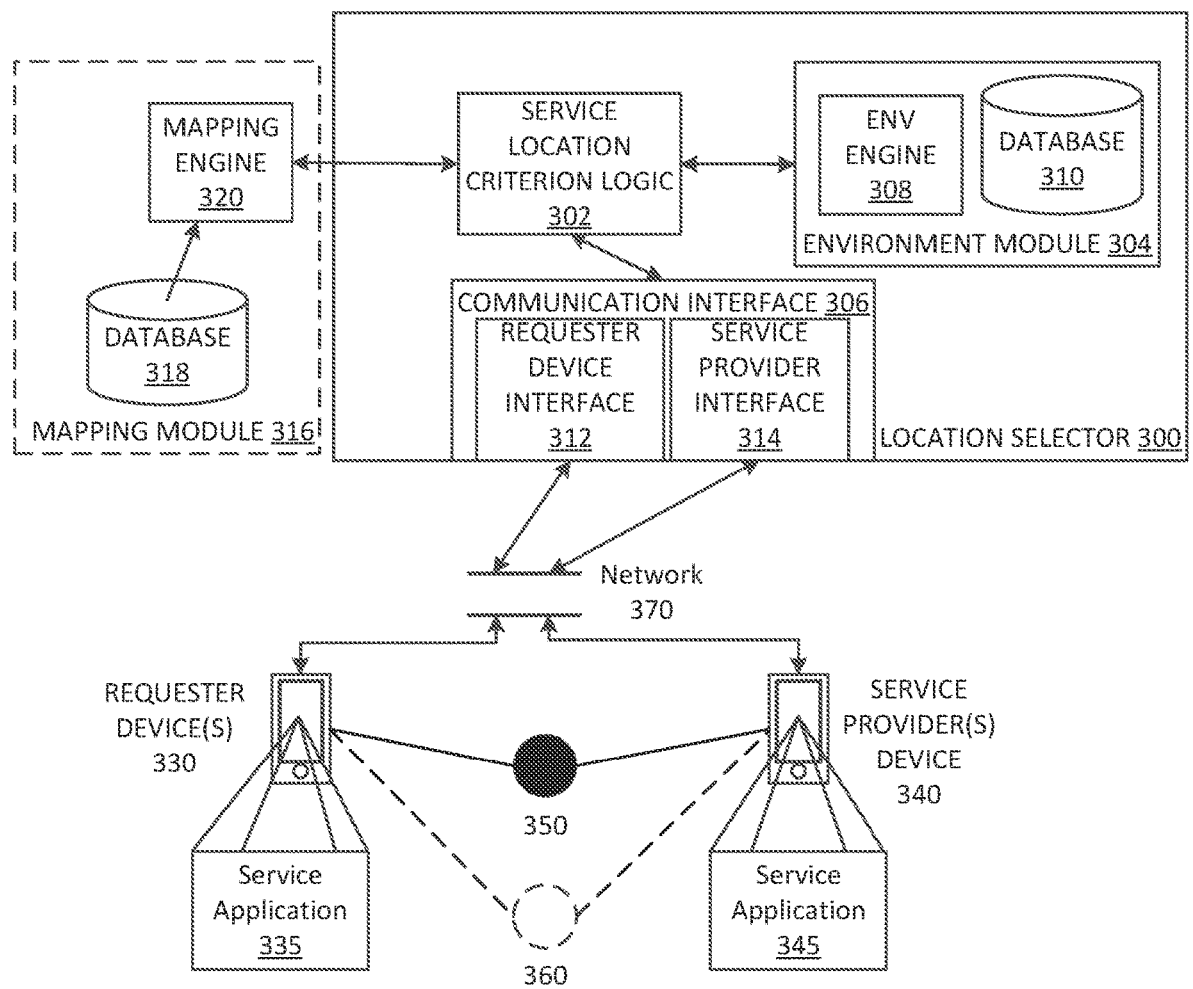
FIG. 3 illustrates an example location selector of the network computer system.

FIG. 3 illustrates an example location selector (e.g., location selector 102) of a network computer system (e.g. network computer system 100). In some implementations, similar to FIG. 1, a network computer system (e.g. network computer system 100) can include location selector 300 with service location criterion logic 302. As illustrated in FIG. 3, location selector 300 can also include environment module 304 and communication interface 306. Location selector 300 can communicate with service application 335 running on requester device(s) 330 and service application 345 running on service provider device(s) 340 through communication interface 306 and over network(s) 370. In some as examples, as illustrated in FIG. 3, communication interface 306 can include requester device interface 312 to communicate over network(s) 370 with service application 335 running on requester device(s) 330. Additionally, communication interface 306 can include service provider interface 314 to communicate over network(s) 370 with service application 345 running on service provider device(s) 340.

Location selector 300 can restrict or authorize a change in first service location 350 (e.g., an original service location) of a service request to second service location 360 (e.g., an alternative service location). In some implementations, location selector 300 can utilize service location criterion logic 302 to change first service location 350 to second service location 360. Service location criterion logic 302 can authorize the change if second service location 360 satisfies a predetermined permissibility criterion of the service request. In some examples, service location criterion logic 302 can determine second service location 360 satisfies a predetermined permissibility criterion if the predicted service cost (e.g., a financial cost to the requestor for the service request) associated with second service location 360 is no greater than the predicted service cost associated with first service location 350. Examples of other predetermined permissibility criteria can pertain to service initialization time (e.g., the time to the start of the service request is shorter for the alternative service location than it is for the original service location) and overall service completion time (e.g., the time to complete the service request is shorter for the alternative service location than it is for the original service location). In some implementations, determining that an alternative service location satisfies a predetermined permissibility criterion can include determining whether the user of requester device(s) 330 consented to the change in service location of the service request (e.g., from first service location 350 to second service location 360). Location selector 300 can transmit instructions to requester device(s) 330 or service provider device(s) 340 to change or associate the service request with second service location 360 in place of first service location 350 of the service request, upon location selector 300 determining second service location 360 satisfies a predetermined permissibility criterion. Examples of second service location 360 can include a latitude and longitude coordinate, a geographical area, a POI, etc. Examples of a POI include a building, a corner of a street intersection, and a section of a street. In some implementations, the POI is nearest to the service provider vehicle or service provider device 340.

In some implementations, service location criterion logic 302 can identify a set of alternative service locations for a user (e.g., user of requester device 330 or service provider associated with provider device 340) to select. The set of alternative service locations can include one or more alternative service locations (e.g., second service location 360) that each satisfy a predetermined permissibility criterion of a service request. In some examples, the alternative service locations can be known service locations that other service requesters have included in their service request. In other examples, the alternative service locations can include a service location that service providers or service requesters have changed the service location of a service request to. In either example, service location criterion logic 302 can determine whether each of the alternative service locations can satisfy a predetermined permissibility criterion.

In some implementations, service location criterion logic 302 can select any alternative service location that can satisfy a predetermined permissibility criterion. In other implementations, service location criterion logic 302 can select any alternative service location that can satisfy a predetermined permissibility criterion and is within a proximity threshold of first service location 350. In yet other implementations, as discussed above, service location criterion logic 302 can utilize sensor data when determining whether the alternative service location satisfies the predetermined permissibility criterion.

In other implementations, service location criterion logic 302 can automatically transmit an instruction to requester device 330 and/or service provider device 340 to change first service location 350 of service request to second service location 360. In such implementations, service location criterion logic 302 can automatically transmit the instruction when service location criterion logic 302 determines that second service location 360 satisfies a predetermined permissibility criterion. In some examples, service location criterion logic 302 can base such a determination on sensor data and/or location data of service provider device 340 and/or requester device 330.

In some implementations, location selector 300 can detect an event to associate the service request with second service location 360, based on sensor data. Examples of the event include location selector 300 determining, from the location data of service provider device 340, that the service provider device 340 or the service provider vehicle has remained motionless (e.g., the vehicle of the service provider or provider device 340 remaining motionless for a predetermined time threshold), and/or that service provider device 340 or the service provider vehicle has not travelled a distance exceeding a predetermined distance threshold (such as during a given time interval). Additionally, in some implementations, in response to determining a service provider is traveling towards first service location 350 of the service request, location selector 300 can detect the event based on sensor data. For example, service location criterion logic 302 can determine a service provider is traveling towards first service location 350 of the service request based on service location criterion logic 302 receiving location data from service provider device 340.

In some examples, the event can further include location selector 300 determining that service provider device 340 or the service provider vehicle is within a proximity distance threshold of first service location 350. Such a proximity distance threshold can be utilized by the location selector 300 to limit the service provider from changing a service location of a service request to an alternative location that could potentially create hardships and increased costs for the service requester (e.g., a location that is inconvenient or much more costly to the service requester). For example, ensuring that service providers are within a proximity distance threshold (e.g., 100 yards) of the first service location 350 may prevent service providers from changing the service locations flippantly, and may help ensure that they are close enough to the first service location to observe legitimate issues with the first service location (congestion, accident, roadblock, illegal parking area, etc.) On the other hand, in accordance with some example embodiments, the proximity distance threshold should also be large enough to still enable a service provider to be able to minimize any hardships and conditions that may detriment one or more service parameters of the service request (e.g., service cost, service initialization time, service completion time, etc.). For example, if the proximity distance threshold is too small, the service provider may be unable to change the service location until it is too late to be of any benefit (e.g., it may prevent the service provider from changing a congested first service location until the service provider is already stuck in the congested area around the first service location). Thus, as an example scenario, suppose the service provider notices that traffic congestion will prevent the service provider from getting to an original first service location of the service request (e.g., first service location 350). As such, suppose the service provider changes the service location of the service request from the original service location to an alternative service location (e.g., to second service location 360). Service location criterion logic 302 can change or associate the service request with alternative service location (e.g., second service location 360) in response to detecting that the service provider vehicle or service provider device 340 of the service provider is, for example, 100 yards or less from the original service location (e.g., first service location 350). In such examples, service location criterion logic 302 can change or associate the service location of the service request only if service provider device 340 or the service provider vehicle is within a proximity threshold from first service location 350 (e.g., 100 yards). Additionally, the proximity distance threshold can be large enough to still allow the service provider to minimize any conditions that may detriment one or more service parameters of the service request (e.g., service cost, service initialization time, service completion time, etc.). In some implementations, service location criterion logic 302 can enable the service provider to change the service location of the service request to an alternative service location (e.g., second service location 360) in response to detecting the events as discussed previously.

Other examples of the event include location selector 300 receiving a user input from either requester device 330 or service provider device 340. For example, the user input can be an instruction consenting to the change in service location from requester device 330. In other examples, the user input can be a request from a device (e.g., service provider device 340 or requester device 330) to associate the service request with second service location 360 in place of first service location 350 (e.g., a service provider or service requester changing or associating the service location of the service request to an alternative service location). In yet other examples, the user input event can be a user input to initiate associating the service request with second service location 360 in place of first service location 350 (e.g., the service provider transmitting a notification to the service requester to request a change in service location of the service request).

In some implementations, mapping engine 320 can route and/or reroute a service provider vehicle (based on the location data of service provider device 340), while maintaining first service location 350. However, at some point, rerouting the service provider vehicle, while maintaining first service location 350, cannot optimize the service request (e.g., in terms degraded service initialization time, overall service completion time, etc.). As such, in some embodiments, location selector 300 can limit user changes to the service location so that a user can only change the service location of the service request if rerouting the service provider and maintaining first service location 350 can no longer optimize the service request. In some examples, the limitation can be based on a proximity threshold of first service location 350 of a service request. For example, suppose the service provider vehicle is within a proximity threshold of 100 yards from first service location 350, but heavy traffic conditions are preventing the service provider vehicle from getting to first service location 350. As such, location selector 300 can transmit to service application 345 an instruction to enable the service provider to change first service location 350 to an alternative service location, in response to location selector 300 determining that the service provider (e.g., service provider 360) is within some proximity of first service location 350. In some implementations, location selector 300 can transmit to service application 345 an instruction to enable the service provider to change first service location 350 to an alternative service location (e.g., POI) that is within a proximity threshold to first service location 350. In other implementations, upon location selector 300 detecting service provider device 340 is motionless and is within a proximity threshold of first service location 350, the location selector 300 may automatically instruct the service provider device 340 and/or requester device 330 to change first service location 350 to a second service location 360 (e.g., the nearest POI or a POI closer to the current location of the provider device 340). In yet other implementations, location selector 300 can restrict a user (e.g., a user of requester device(s) 330 or service provider associated with provider device 340) from selecting and/or associating the service request with second service location 360 that is not within a proximity threshold to first service location 350 of the service request and/or that does not satisfy a predetermined permissibility criterion.

In examples where the alternative location is a geographic area, the restriction can be based on that geographic area. For example, location selector 300 can transmit an instruction to requester device 330 and/or service provider(s) device 340 to limit a user input (on service application 335 and/or 345 respectively) so that the user can only change first service location 350 to second location 360 that is within the geographic area corresponding to the alternative location. Other examples of restrictions or limitations include frequency (e.g. a number of times the user of requester device 330 or service provider associated with provider device 340 can change the service location), a predetermined proximity threshold to first service location 350), and a time period (e.g. a grace period or a time limit) after the service request has been transmitted or accepted by the service provider when the user of requester device 330 or service provider can change the service location).

Location selector 300 can change a service provider already assigned to a service request (e.g., the service provider that has accepted a service invitation of the service request) to a second service provider. In some implementations, service location criterion logic 302 can reassign the service provider in response to changing first service location 350 of the service request to second service location 360. For example, service location criterion logic 302 may transmit an instruction to a device (e.g., requester device 330 and/or service provider device 340) to associate a service request with second service location 360 in place of first service location 350 of the service request. The service request may already have a service provider assigned to it. After which, service location criterion logic 302 can determine that a second service provider can satisfy the predetermined permissibility criterion of the service request better than the service provider already assigned to the service request (e.g. based on the current locations of each service provider, the second service provider can complete the service request earlier than the service provider that accepted a service invitation, such as when the second service provider is currently located closer to the second service location 360 than the original service provider).

In some examples, service location criterion logic 302 can reassign service providers in response to the user of requester device 330 consenting to the change. In other examples, service location criterion logic 302 can reassign a service provider of a first service request to a second service provider assigned to a second service request. For example, suppose service location criterion logic 302 receives a first service request including an original service location from a first requester device 330 and a second service request including a second service location from a second requester device 330. Also suppose a first service provider accepts the service invitation of the first service request and a second service provider accepts the service invitation of the second service request. Service location criterion logic 302 can determine that another service location satisfies a predetermined permissibility criterion for the first service request. Additionally, service location criterion logic 302 can determine that by associating the first service request with the other service location, the second service provider satisfies the predetermined permissibility criterion of the first service request better than the first service provider. As such, service location criterion logic 302 can assign the second service provider to the first service request associated with the other service location. Additionally, service location criterion logic 302 can select another service provider for the second service request. In some examples, if service location criterion logic 302 determines that the first service provider satisfies the predetermined permissibility criterion of the second service request, then service location criterion logic 302 can assign the first service provider to the second service request.

Information describing each repositioning event (e.g., each event where a user of requester device(s) 330 and/or service provider device(s) 340 triggers a change in service location of a corresponding service request) can be stored in database 310 and/or 318. In some implementations, service location criterion logic 302 can recommend an alternative location (e.g., second service location 360) to other users of other requester devices 330 that have already selected a particular service location in connection with a service request, if a repositioning event associated with the particular service location meets a repositioning event threshold (e.g., if users of requester device(s) 330 and service provider device(s) 330 have changed the particular service location, in connection with their own corresponding service requests, more than or equal to a predetermined number of times). For example, if location selector 300 determines that users of requester device(s) 330 are frequently changing first service location 350 (e.g., a busy street in front of a mall) in their corresponding service requests to second service location 360 (e.g., a quieter side street of the mall), service location criterion logic 302 can recommend, to future users (e.g., users of requester device 330 or service provider device(s) 330) who included first service location 350 in their service requests, that they should change the service location to second service location 360.

In some implementations, location selector 300 can automatically "flag" a service location that users of requester devices 330 are frequently changing and/or that are associated with many repositioning events. In such implementations, there may be a problem with said service location (e.g., the service location may be an illegal location to stop or pick up a service requester, or the service location may be near an area of high traffic congestion). As such, location selector 300 can notify an administrator of the network computer system to review and determine the potentially problematic service location. In some examples, suppose location selector 300 determines that the number of repositioning events associated with a service location meets a repositioning even threshold. Additionally, in such examples, location selector 300 can associate a flag identifier to said service location and can notify an administrator of the network computer system to determine whether said service location is in fact problematic. If said service location is in fact problematic, the administrator can associate another identifier to said service location that can trigger location selector 300 to prevent a service requester or service provider from utilizing said service location in the future (e.g., either as an alternative service location or as an initial service location for a service request).

In some implementations, when the user of requester device 330 and service provider are attempting to change the service location, the service application 335 and application 345 can provide to the user of requester device 330 and service provider, respectively, a drop-down menu including a sample reason why the user of requester device 330 and/or service provider are changing the service location (e.g., heavy traffic conditions, an accident near the original service location, a road block, an area where it is not legal to stop or pick up passengers, etc.). The selected reason can be associated with the repositioning event data that is stored in database 310. Additionally, in some examples, service location criterion logic 302 can use the reason associated with each repositioning event in determining whether to recommend to users of other requester device(s) 330 a second or alternative location (e.g., when the number of repositioning events associated with the original location and associated with a particular reason meets a predetermined threshold). The service location criterion logic 302 can also display the reason when recommending to users of other requester device(s) 330 an alternative location (e.g., when the number of repositioning events associated with the original location and associated with a particular reason meets a predetermined threshold)

Location selector 300 can include environment module 304. Environmental module 304 can include environmental engine 308 and database 310. Database 310 can receive and store sensor data. In some implementations, sensor data can include real-time traffic data from a third-party source received from mapping module 316. In such implementations service location criterion logic 302 can utilize the real-time traffic data from mapping module 316 to determine whether second service location 360 satisfies a predetermined permissibility criterion of a service request. In other implementations, sensor data can include environmental data from one or more sensors of one or more service provider vehicles in one or more geographical areas. In some examples, the one or more vehicles are one or more autonomous vehicles. Each sensor can detect data of the environment surrounding a corresponding service provider vehicle (e.g., speed of the vehicle, the average speed of the service provider vehicle, number of objects (e.g. cars, motorcycles, cyclists) around the service provider vehicle at a given timeframe, how far an object is from the service provider vehicle, the speed of each object around the service provider vehicle, the location of each service provider vehicle, etc.).

In other examples, a service provider can transmit environmental data through service application 345 to service location criterion logic 302 (e.g. road closures, heavy traffic, etc.)

Environmental engine 308 can process the environmental data to determine real-time traffic data. Service location criterion logic 302 can utilize the real-time traffic data from environmental engine 308 and location data of service provider device 340 (e.g., location data received from a location based resources (e.g., global positioning system (GPS) resources) of service provider device 340), to determine whether a service location (e.g., second service location 360) satisfies a predetermined permissibility criterion of a service request. For example, the environmental data can indicate that the vehicle is traveling at 5 mph, with an object (e.g., car/motorcycle/cyclist) 5 feet in front of the vehicle that is also traveling at 5 mph. As such, service location criterion logic 302 can determine that the current traffic is heavy for that particular vehicle because both the vehicle and the object are traveling at relatively low rates (5 mph). Additionally, service location criterion logic 302 can also utilize the current location of service provider device 340 to also determine that the current traffic is heavy for that particular service provider vehicle in that particular area. Moreover, based on that environmental data and the location data of the service provider assigned to a service request, service location criterion logic 302 can restrict a service location change (e.g., first service location 350) to an alternative service location (e.g., second service location 360) that is in that particular area. Service location criterion logic 302 can determine, based on the current location of the service provider and the real-time traffic conditions, that the alternative service location (e.g., second service location 360) does not satisfy a predetermined permissibility criterion (e.g., a rule that a predicted service completion time of the alternative service location must be less than the predicted service completion time of the original service location associated with the service request). As such, service location criterion logic 302 can transmit an instruction to service provider device 340 of the service provider of the service request to restrict associating the service request with the alternative service location (e.g., second service location 360) in place of the service location (e.g., first service location 350) of the service request.

In some implementations, service location criterion logic 302 can utilize historical traffic data (e.g. speed limits, historical traffic conditions for one or more regions during one or more timeframes, etc.) when determining whether the alternative service location (e.g., second service location 360) satisfies a predetermined permissibility criterion of a service request. In some implementations, service location criterion logic 302 can utilize real-time weather data for one or more regions stored in database 318, when determining whether the alternative service location (e.g., second service location 360) satisfies a predetermined permissibility criterion of a service request. In some implementations, as illustrated in FIG. 3, service location criterion logic 302 can receive historical traffic and road laws data from mapping module 316. Mapping module 316 can include mapping engine 320 and database 318. Functionalities of mapping engine 320 are similar to the functionalities of mapping engine 106 of FIG. 1. Database 318, similar to database 104 of FIG. 1, can store historical traffic data received from a third-party source and road laws data received from a third-party source.

Network 114 and 370 can include one or more networks. Network 114 and 370 can be a conventional type, wired or wireless, and can have numerous configurations include a star a star configuration, token ring configuration, or other configurations. Furthermore, network 114 and 370 can include an intranet, a local area network (LAN), a wide area network (WAN) (e.g., the Internet), and/or other interconnected data paths across which multiple devices can communicate. In some embodiments, network 114 and 370 can be a peer-to-peer network. Network 114 and 370 can also be coupled with or include portions of a telecommunications network for sending data using a variety of different communication protocols. In some embodiments, network 114 and 370 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the examples of FIGS. 1 and 3, each illustrate one network 114 and 370, network 114 and 370 can be more than one network. For example, as illustrated in FIG. 1, network computer system 100, requester device(s) 120, and service provider device(s) 130 can communicate over network 114 using wired or wireless connections, or combinations thereof. In another example, as illustrated in FIG. 3, requester device(s) 330, service provider device(s) 340 and location selector 300 communicate over network 260 using wired or wireless connections, or combinations thereof.

Methodology

Figure 4A:
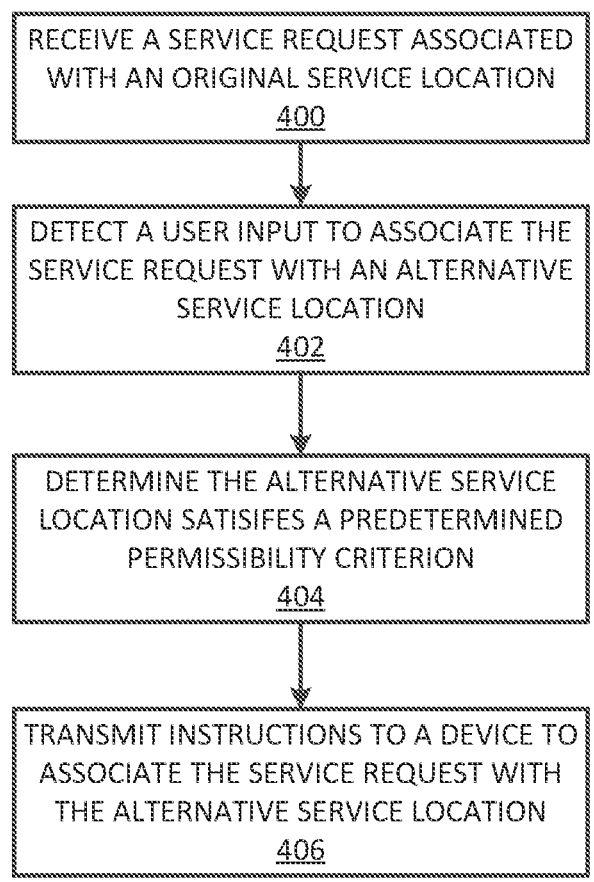
FIG. 4A illustrates an example method for associating a service request with an alternative service location, based on detecting a user input to associate the service request with the alternative service location.
Figure 4B:
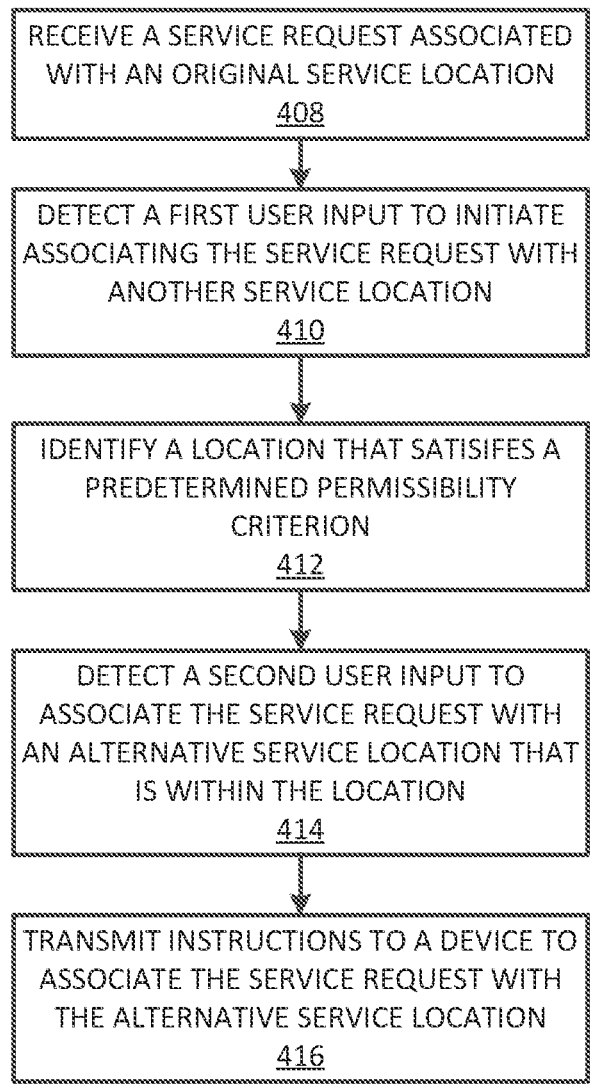
FIG. 4B illustrates an example method for associating a service request with an alternative service location, based on alternative service locations identified by a network computer system.
Figure 5:
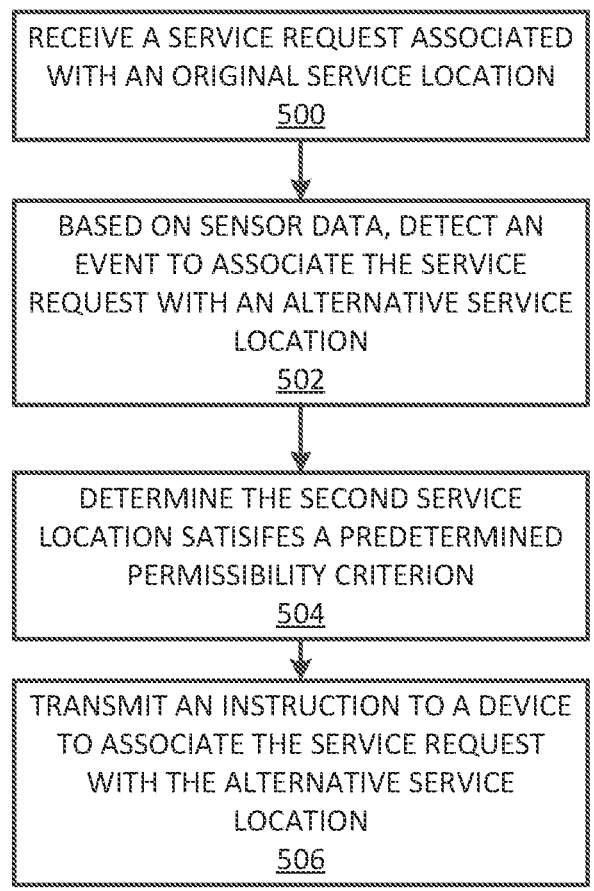
FIG. 5 illustrates an example method for associating a service request with an alternative service location, based on sensor data and the detection of an event.
Figure 6:
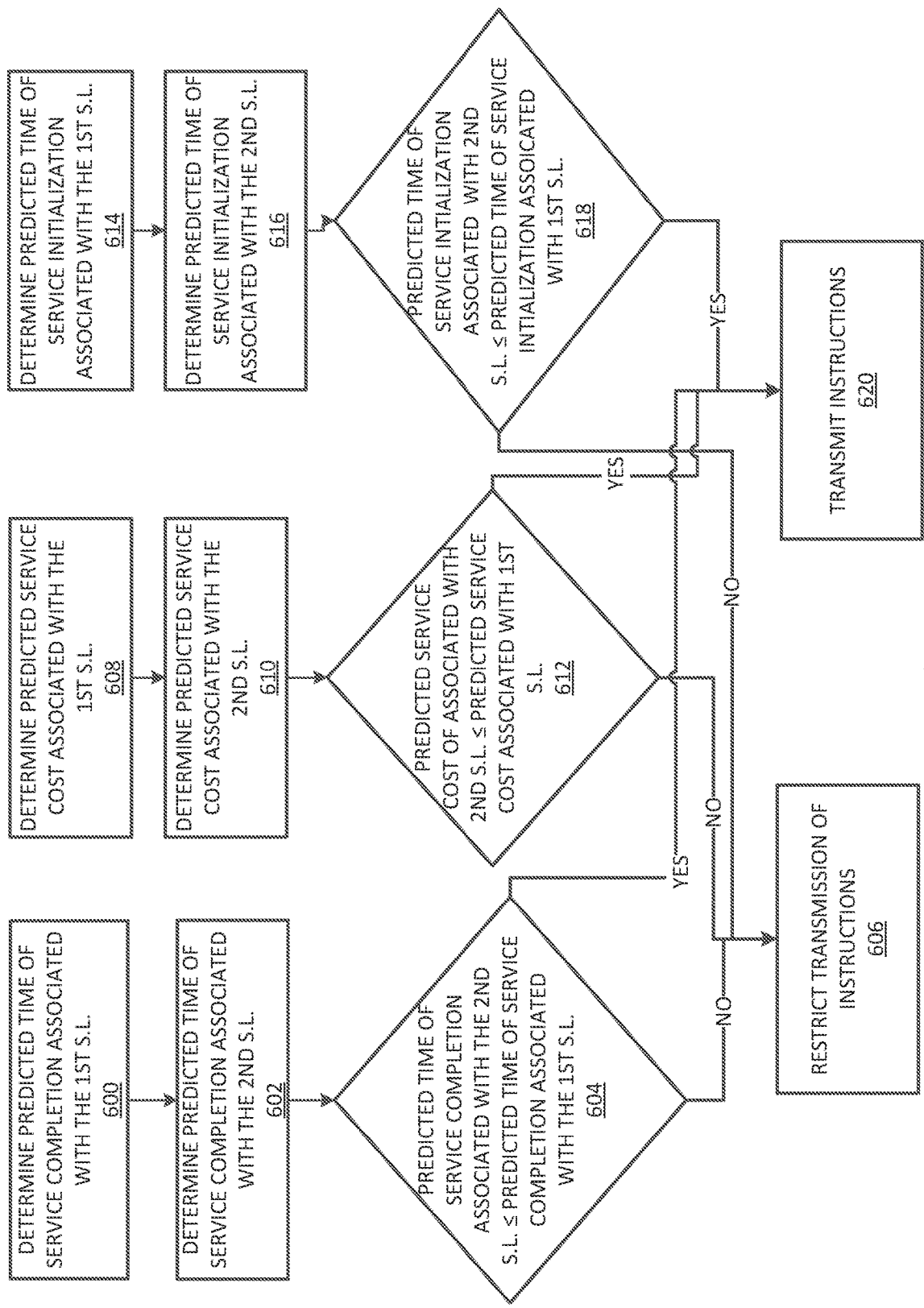
FIG. 6 illustrates an example method for determining whether the alternative service location satisfies a predetermined permissibility criterion.
Figure 7:
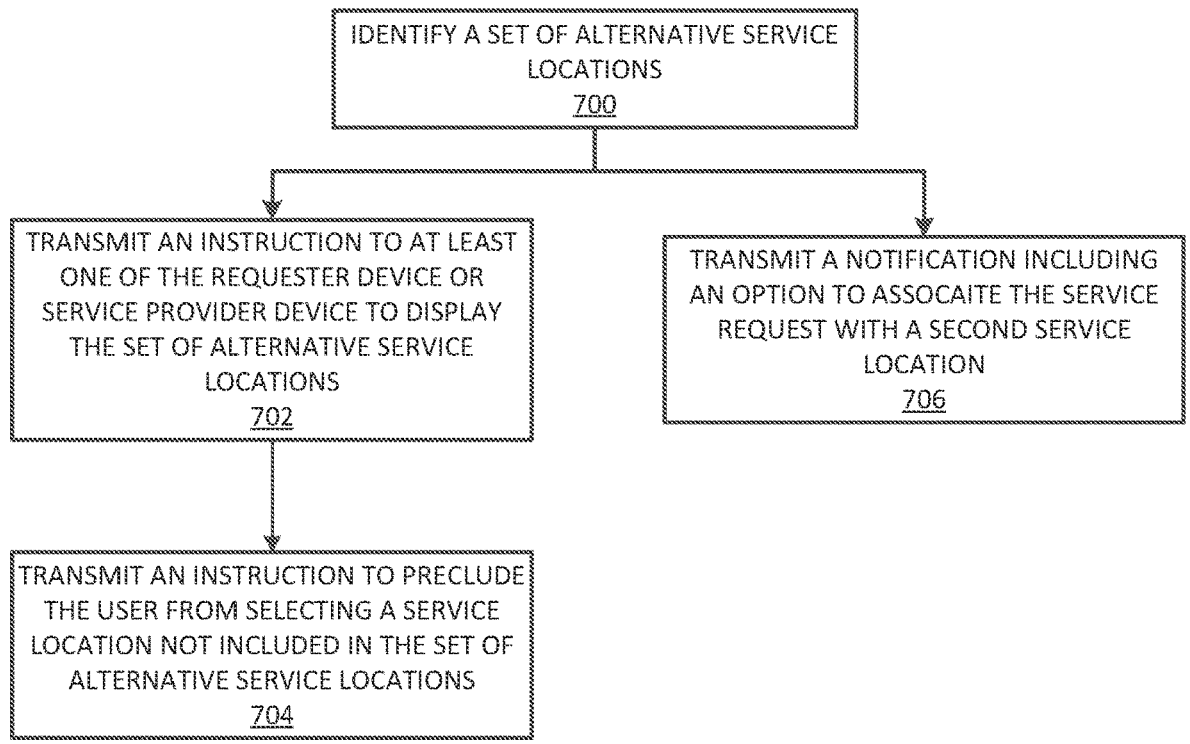
FIG. 7 illustrates an example method for transmitting a notification that includes an option to associate a service request with an alternative service location.
Figure 8:
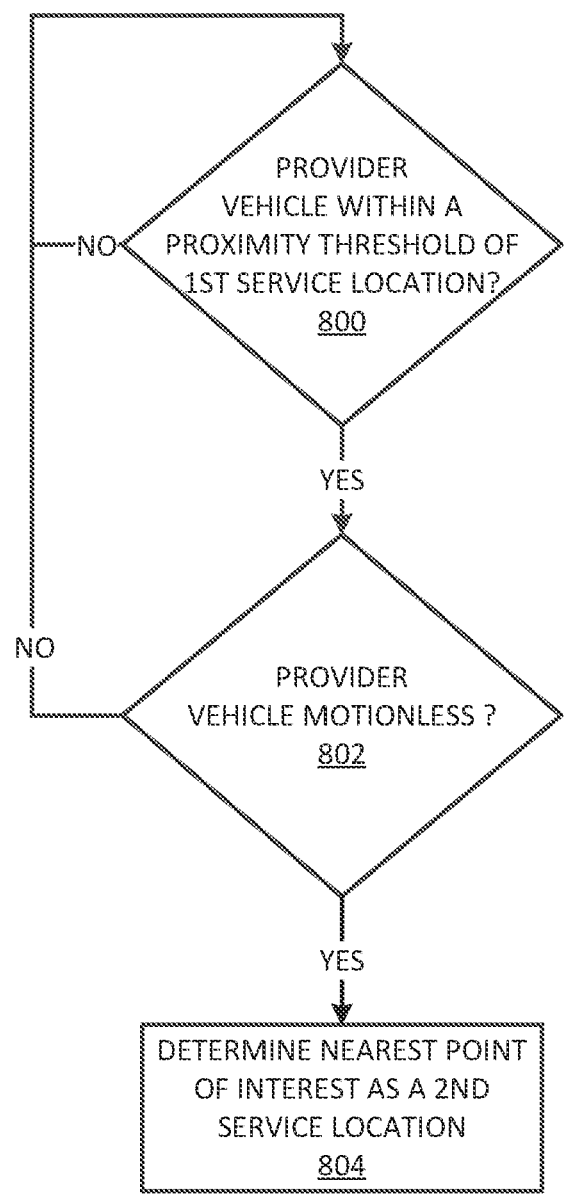
FIG. 8 illustrates an example method for selecting a nearest point of interest from a motionless service provider.

FIG. 4A illustrates an example method for associating a service request with an alternative service location, based on detecting a user input to associate the service request with the alternative service location. FIG. 4B illustrates an example method for associating a service request with an alternative service location, based on alternative service locations identified by a network computer system. FIG. 5 illustrates an example method for associating a service request with an alternative service location, based on sensor data and the detection of an event. FIG. 6 illustrates an example method for determining whether the alternative service location satisfies a predetermined permissibility criterion. FIG. 7 illustrates an example method for transmitting a notification that includes an option to associate a service request with an alternative service location. FIG. 8 illustrates an example method for selecting a nearest point of interest from a motionless service provider vehicle. In the below discussions of FIGS. 4A through 8, reference may be made to reference characters representing like features as shown and described with respect to FIG. 1 and/or FIG. 3 for purpose of illustrating a suitable component for performing a step or sub-step being described.

FIG. 4A illustrates an example method for associating a service request with an alternative service location, based on detecting a user input to associate the service request with the alternative service location. In some implementations, as illustrated in FIG. 4A, network computer system 100 can receive a service request associated with a first or original service location (400). In some examples, a user of requester device 120 can input and associate the service request with a service location through service application 125. In such examples, the service location can be associated with a service initialization location (e.g., a pickup location for a transport service request). Examples of a service location user input include a user supplied address, a selected POI from a set of identified POIs near the current location of requester device 120, or "pin-drop" location on a map interface executed by an application on requester device 120. Additionally, a user of requester device 120 can change or reposition the service initialization location through service application 125.

Additionally, network computer system 100 can detect a user input to associate the service request with an alternative service location (402). In some examples, the requester device 120 can transmit a user input to network computer system 100 to associate the service request with an alternative service location. In other examples, service provider device 130 can transmit a user input to network computer system 100 to associate the service request with an alternative service location. The user input can include an instruction or request to associate the service request with the alternative service location in place of the original service location. In some examples, the alternative service location can be different from the original service location.

Upon detecting a user input to associate the service request with an alternative service location, network computer system 100 can determine that the alternative service location satisfies a predetermined permissibility criterion (404). In some examples, service location criterion logic 140 or 302 can determine whether the alternative service location satisfies a service completion criterion of the service request. For example, service location criterion logic 140 or 302 can determine whether a predicted service initialization time of the alternative service location is less than or equal to a predicted service initialization time of the original service location. Other examples of a predetermined permissibility criterion can include and pertain to service initialization time (e.g., the time to the start of the service request is shorter for the alternative service location than it is for the original service location) and overall service completion time (e.g., the time to complete the service request is shorter for the alternative service location than it is for the original service location). In some implementations, a predetermined permissibility criterion may include a rule requiring confirming that the user of requester device(s) 120/330 consented to the change in service location of the service request (e.g., location selector 102/300 detecting a consent to change notification from requester device(s) 120/330, respectively). In other implementations, the predetermined permissibility criterion can be in part also based on a proximity criterion (e.g. the alternative service location is within a proximity threshold of the original service location).

As such, network computer system 100 can transmit an instruction to cause a device to associate the service request with the alternative service location in place of the original service location (406). In some examples, service location criterion logic 140 (or service location criterion logic 302) can transmit the instruction to service provider device(s) 130 (or service provider device(s) 340). As such, service provider device 130/340 can associate the service request with the alternative service location in place of the original service location. In other examples, service location criterion logic 140 (or service location criterion logic 302) can transmit an instruction to requester device(s) 120 (or requester device(s) 330). As such, requester device 120/330 can associate the service request with the alternative service location in place of the original service location. In some examples, as discussed, location selector 102/300 can restrict or limit a user input of requester device(s) 120/330 and/or service provider device(s) 130/340.

FIG. 4B illustrates an example method for associating a service request with an alternative service location, based on alternative service locations identified by a network computer system. Similar to the example method of FIG. 4A, network computer system 100 can receive a service request associated with a first or original service location (408). Additionally, network computer system 100 can detect a first user input to initiate associating the service request with another service location (410). For example, network computer system 100 can detect that a user has selected a user interface element presented by service application 125/135 (e.g., "EDIT" button 210 in FIG. 2A) requesting a change in the service location of the service request to an alternative service location, without yet specifying the alternative service location. In some examples, service provider device 130 can transmit information described such a user input to initiate associating the service request with another service location to network computer system 100. In such an instance, the request may not include an alternative service request.

In response to network computer system 100 detecting the first user input, network computer system 100 can identify a location that satisfies a predetermined permissibility criterion of the service request (412). In some examples, service location criterion logic 140 or 302 can identify a location that satisfies a predetermined permissibility criterion of the service request. In other examples, the location can be from a set of identified locations that each satisfy a predetermined permissibility criterion of the service request. Furthermore, in some examples, the predetermined permissibility criterion can be in part also based on a proximity criterion (e.g., the location is within a proximity threshold of the original service location or the location is from a set of identified locations that are each within a proximity threshold of the original service location). In some implementations, network computer system 100 can provide to requester device 120 and/or service provider device 130 the identified location that satisfies a predetermined permissibility criterion that includes a proximity criterion (e.g., by transmitting an instruction and/or application data to service application 125/135 to present the identified location that satisfies a predetermined permissibility criterion that also includes a proximity criterion).

Thereafter, network computer system 100 can detect a second user input to associate the service request with an alternative service location that is within or that corresponds to the identified location of step 412 (414). In some examples, the second user input is transmitted from service application 125 running on requester device 120. In other examples, the second user input is transmitted from service application 135 running on service provider device 130. The second user input can include an instruction or request to associate the service request with the alternative service location in place of the original service location. In some examples, the alternative service location can be different from the original service location.

In response to network computer system 100 detecting the second user input, network computer system 100 can transmit an instruction to cause a device to associate the service request with the alternative service location in place of the original service location (416). Similar to step 406 of FIG. 4A, service location criterion logic 140 can transmit the instruction to cause service provider device(s) 130 and/or requester device(s) 120 to associate the service request with the alternative service location in place of the original service location. Furthermore, similar to step 406 of FIG. 4A, the origination of the user input can determine which device (e.g., provider device(s) 130/340 or requester device(s) 120/330) can receive the instruction. In some examples, as discussed, location selector 102 can restrict or limit a user input of requester device(s) 120 and/or service provider device(s) 130.

FIG. 5 illustrates an example method for associating a service request with an alternative service location, based on sensor data and the detection of an event. Similar to the example methods of FIGS. 4A and 4B, network computer system 100 can receive a service request associated with a first or original service location (500). In some implementations, location selector 102/300 (e.g., service location criterion logic 140/302) can identify an alternative service location (or a set of alternative service locations). In some examples, the alternative service location can be a known service location that other service requesters have included in their own corresponding service requests as original service locations. In other examples, the alternative service location can be a service location that service providers or service requesters have used to replace the original service location in their own corresponding service requests. In yet other examples, the alternative service location can be within a proximity threshold of the service location already associated with the service request.

Network computer system 100 can detect an event to associate the service request with an alternative service location, based on sensor data (502). In some implementations, network computer system 100 can detect the event to associate the service request with an alternative service location, in response to determining a service provider assigned to the service request is in the process of fulfilling the service request (e.g., the service provider has accepted the service request) and/or is traveling towards the original service location. In such implementations, network computer system 100 can determine the service provider is traveling towards the original service location based on the location data of a service provider device (e.g., service provider device 130/340) being transmitted to network computer system 100. That way, in some examples, the alternative service location can be different from the original service location. Network computer system 100 can thus enable the service location of the service request to be changed, even when the service provider is already en route to the initial service location. Thus, the service requester may be provided some flexibility to change the service location when, for example, the initial service location was made in error or when circumstances make the initial service location inconvenient. As described with other examples, network computer system 100 can implement controls to restrict the ability of the service requester to change the initial service location to avoid, for example, added hardship or cost to the service provider. As such, the added flexibility provided to the service requester does not cause undue hardship to the service provider.

In any of the above implementations or examples, network computer service 100 can determine that the alternative service location satisfies a predetermined permissibility criterion (504). In some examples, similar to the methods illustrated in FIG. 4A, service location criterion logic 140/302 can determine that the alternative service location satisfies the predetermined permissibility criterion of the service request. Examples of the determination of whether a predetermined permissibility criterion satisfies a service request were previously discussed and are further discussed below.

As such, network computer service 100 can transmit an instruction to cause at least one of the user device (e.g., requester device 120) or service provider device (e.g., service provider device 130) to associate the service request with the alternative service location in place of the original service location (506). For example, similar to step 406 of FIG. 4A and FIG. 4B, service location criterion logic 140/302 can transmit the instruction to service provider device(s) 130 (or service provider device(s) 340) and/or requester device(s) 120 (or requester device(s) 330) to associate the service request with the alternative service location in place of the original service location. In some implementations, network computer service 100 can transmit the instruction to the devices (e.g., requester device 120 and/or service provider device 130), if the user of requester device 120 consents to the change. In such implementations, once network computer service 100 determines that the alternative service location satisfies a predetermined permissibility criterion, network computer service 100 can transmit a request to requester device 120 to change the service location of the service request to the alternative service location. Additionally, network computer system 100 can associate the service location of the service request with the alternative service location in place of the original service location, if the user of requester device 120 sends from requester device 120 to network computer system 100 a notification consenting to the change. However, network computer system 100 cannot change the service location of the service request if the user of requester device 120 does not send a notification consenting to the change, or sends a notification denying the change, to network computer system 100.

FIG. 6 illustrates an example method for determining whether the alternative service location satisfies a predetermined permissibility criterion. In many implementations, network computer system 100 can restrict or authorize changing a first or original service location of a service request to a second or alternative service location. In such implementations, network computer system 100 can transmit an instruction to change a service location to a new or alternative service location, based on whether the alternative service location satisfied a predetermined permissibility criterion of the service request. In some examples, network computer system 100 can include location selector 102/300 that utilizes service location criterion logic 140/302 to determine whether the alternative service location satisfies the predetermined permissibility criterion. Additionally, in other examples, changing a service location of a service request can be based on service location criterion logic 140/302 determining that the alternative service location satisfies a predetermined permissibility criterion and the user of requester device(s) 120/330 sent a notification of consent to change the service location to location selector 300.

In some examples, the predetermined permissibility criterion can be related to a time of service completion. In such examples, service location criterion logic 140/302 can determine the predicted time of service completion associated with an original service location (S.L.) associated with the service request (600). For example, service location criterion logic 140/302 can determine the predicted time of service completion by calculating the time it takes for the service provider to travel from its current location (e.g., determined from location data received from service provider 130) to the original service location and then to a final service location associated with the service request. In some examples, network service computer system 100 can determine the current location of the service provider by location data received from location based resources (e.g., global positioning system (GPS) resources) of service provider device 130. In some implementations, network computer service 100 can utilize sensor data from location selector 102 and location data from service provider device 130 to determine the predicted time of service completion associated with the original service location. In some examples, the original service location can be the service initialization location (e.g., a pickup location of a transport service request).

Additionally, service location criterion logic 140/302 can also determine the predicted time of service completion associated with an alternative service location (S.L.) (602). Utilizing the same principles as previously discussed, service location criterion logic 140/302 can determine the predicted time of service completion by calculating the time it takes for the service provider to travel from its current location (e.g. determined from location data received from service provider 130) to the alternative service location and then to the final service location. In some implementations, network computer service 100 can utilize sensor data from location selector 102 and location data from service provider device 130 to determine the predicted time of service completion of the alternative service location. In some examples, the alternative service location can be a service location that a user of requester device 120 or a service provider would like to change the service location of the service request to. In other examples, the alternative service location can be a service location that service location criterion logic 140/302 identifies and recommends, to the user of requester device 120 or service provider, as the new service location of the service request.

Moreover, service location criterion logic 140/302 can compare the determined predicted times of service completion. For example, service location criterion logic 140/302 can determine whether the predicted time of service completion of the alternative service location is less than or equal to the predicted time of service completion of the original service location (604). If service location criterion logic 140/302 determines the predicted time of service completion of the alternative service location is less than or equal to the predicted time of service completion of the original service location, then service location criterion logic 140/302 can transmit an instruction to one or more devices (e.g., requester device 120 or service provider device 130) to associate the service request with the alternative service location in place of the original service location (620). If service location criterion logic 140/302 determines the predicted time of service completion of the alternative service location is more than the predicted time of service completion of the original service location, then service location criterion logic 140/302 can restrict the transmission of the instructions to one or more devices (e.g., requester device 120 or service provider device 130) to associate the service request with the alternative service location in place of the original service location of the service request (606).

In other examples, the predetermined permissibility criterion can be related to a service initialization time (e.g., a pickup time of a transport service request). In such examples, service location criterion logic 140/302 can determine the predicted service initialization time associated with an original service location (S.L.) associated with the service request (608). For example, service location criterion logic 140/302 can determine the predicted service initialization time by calculating the time it can take for the service provider to travel from its current location (e.g., determined from location data received from location based resources (e.g., global positioning system (GPS) resources) of service provider device 130) to the original service location. In some implementations, network computer service 100 can utilize sensor data from location selector 102 and location data from service provider device 130 to determine the predicted service initialization time of the original service location. In some examples, the original service location can be the service initialization location (e.g., a pickup location of a transport service request).

Additionally, service location criterion logic 140/302 can also determine the predicted service initialization time associated with an alternative service location (S.L.) (610). Utilizing the same principles as previously discussed, service location criterion logic 140/302 can determine the predicted service initialization time by calculating the time it takes for the service provider to travel from its current location (e.g. determined from location data received from service provider 130) to the alternative service location. In some implementations, network computer service 100 can utilize sensor data from location selector 102 and location data from service provider device 130 to determine the predicted service initialization time with the alternative service location. In some examples, the alternative service location can be a service location that a user of requester device 120 or a service provider would like to change the service location of the service request to. In other examples, the alternative service location can be a service location that service location criterion logic 140/302 identifies and recommends, to the user of requester device 120 or service provider, as the new service location of the service request.

Moreover, service location criterion logic 140/302 can compare the determined predicted service initialization times. For example, service location criterion logic 140/302 can determine whether the predicted service initialization time of the alternative service location is less than or equal to the predicted service initialization time of the original service location (612). If service location criterion logic 140/302 determines the predicted service initialization time of the alternative service location is less than or equal to the predicted service initialization time of the original service location, then service location criterion logic 140/302 can transmit instructions to one or more devices (e.g., requester device 120 or service provider device 130) (620) to associate the service request with the alternative service location in place of the original service location. If service location criterion logic 140/302 determines the predicted service initialization time of the alternative service location is more than the predicted service initialization time of the original service location, then service location criterion logic 140/

302 can restrict the transmission of the instructions to one or more devices (e.g., requester device 120 or service provider device 130) to associate the service request with the alternative service location in place of the original service location of the service request (606).

In yet other examples, the predetermined permissibility criterion can be related to a service cost (e.g., the fare associated with completing a transport service request). In such examples, service location criterion logic 140/302 can determine a predicted service cost associated with an original service location (S.L.) of the service request (614) (e.g., the fare associated with completing a transport service request associated with a pickup location corresponding to the original service location and associated with a drop off location). For example, service location criterion logic 140/302 can determine the predicted service cost of an original service location based on sensor data from location selector 102 and location data of the service provider device assigned to the service request (e.g., determined from location data received from location based resources, such as global positioning system (GPS) resources, of service provider device 130). In some examples, the original service location can be the service initialization location (e.g., a pickup location of a transport service request).

Additionally, service location criterion logic 140/302 can also determine the predicted service cost associated with an alternative service location (S.L.) (e.g., the fare associated with completing a transport service request associated with a pickup location corresponding to the alternative service location and associated with a drop off location) (616). Utilizing the same principles as previously discussed, service location criterion logic 140/302 can determine the predicted service cost of an alternative service location based on sensor data from location selector 102 and location data of the service provider device assigned to the service request (e.g., determined from location data received from location based resources, such as global positioning system (GPS) resources, of service provider device 130). In some examples, the alternative service location can be a service location that a user of requester device 120 or a service provider would like to change the service location of the service request to. In other examples, the alternative service location can be a service location that service location criterion logic 140/302 identifies and recommends, to the user of requester device 120 or service provider, as the new service location of the service request.

Moreover, service location criterion logic 140/302 can compare the determined predicted service costs. For example, service location criterion logic 140/302 can determine whether the predicted service cost of the alternative service location is less than or equal to the predicted service cost of the original service location (618). If service location criterion logic 140/302 determines the predicted service cost of the alternative service location is less than or equal to the predicted service costs of the original service location, then service location criterion logic 140/302 can transmit instructions to one or more devices (e.g., requester device 120 or service provider device 130) (620) to associate the service request with the alternative service location in place of the original service location. If service location criterion logic 140/302 determines the predicted service cost of the alternative service location is more than the predicted service cost of the original service location, then service location criterion logic 140/302 can restrict the transmission of the instructions to one or more devices (e.g., requester device 120 or service provider device 130) to associate the service request with the alternative service location in place of the original service location of the service request (606).

FIG. 7 illustrates an example method for transmitting a notification that includes an option to associate a service request with an alternative service location in place of an original service location of the service request. Network computer system 100 can intelligently identify a set of alternative service locations (700). The set of alternative locations can include one or more identified alternative service locations. Additionally, based on previously described principles, each identified alternative location can satisfy a predetermined permissibility criterion. In some implementations, as previously described, the predetermined permissibility criterion can include a proximity criterion.

In some implementations, network computer system 100 can transmit an instruction to at least one of requester device 120 or service provider device 130 to display each alternative service location (702). In some examples, the instruction can cause service application 125 running on requester device 120 to launch a map interface. In other examples, the instruction can cause service application 135 running on provider device 130 to launch a map interface. Additionally, the instruction can also cause service application 125 and/or service application 135 to generate graphical representations of each identified alternative location on their respective map interfaces.

In some examples, network computer system 100 can provide an additional instruction or application data to service application 125/135, to cause service application 125/135 to highlight the graphical representations of each identified alternative service location. In other examples, network computer system 100 can transmit an additional instruction to at least one of requester device 120 or service provider device 130 to preclude a user (e.g., a user of requester device 120 or service provider) from selecting a service location not included in the set of alternative service locations (704).

In some implementations, network computer system 100 can transmit a recommendation to change the service location to one of the identified alternative service locations to requester device 120 and/or service provider device 130. For example, network computer system 100 can transmit a notification that includes an option to associate the service request with an alternative or second service location of the set of identified service locations (706). Additionally, in some examples the option can include a reason why the alternative service location is better than a first or original service location of the service request. In some examples, the reasoning can be based on a predetermined permissibility criterion. In other examples, the recommendation or notification can include multiple options and each option is associated with an alternative service location of the set of alternative service locations. Additionally, in such examples, each option can include a reason why that particular second or alternative service location is better than an original service location of the service request. In some examples, the reasoning can be based on a predetermined permissibility criterion (e.g., a reason to change an original service location of a service request to an alternative service location may be that the change can reduce an overall service completion time).

FIG. 8 illustrates an example method for selecting a nearest point of interest to a motionless service provider vehicle. In some examples, the service provider is near a service location of a service request, but due to environmental conditions (e.g., traffic) the service provider would like to change the service location. In some implementations, network computer system 100 can determine whether the vehicle of the service provider is within a proximity threshold of a first or original service location associated with a service request (800). Network computer system 100 can utilize location data of the service provider device 130 to determine whether the vehicle of the service provider is within a proximity threshold of an original service location. In some examples, the original service location can be the service initialization location (e.g., the pickup location of a transport request).

If network computer system 100 determines the vehicle of the provider device is within the proximity threshold of the original service location, then network computer system 100 can determine whether the vehicle of the service provider is motionless (802). In some examples, network computer system 100 can determine the vehicle has remained motionless if the vehicle has remained motionless for a predetermined time threshold (e.g., 5 minutes). In other examples network computer system 100 can determine the vehicle has remained motionless if the vehicle has not travelled a distance exceeding a predetermined distance threshold (e.g., 2 inches), such as within a predetermined time interval. Additionally, in such examples, network computer system 100 can determine whether the vehicle of a service provider is motionless based on the location data received from service provider device 130 of the service provider (e.g., whether the vehicle has remained motionless for a predetermined time threshold, whether the vehicle has not travelled a distance exceeding a predetermined distance threshold during a predetermined time interval, etc.).

If network computer system 100 determines that the vehicle of the service provider is motionless, then network computer system 100 can determine a nearest POI to the vehicle of the service provider to change the service location of the service request to (804). Examples of a POI include a building, a corner of a street intersection, and a section of a street. In some examples, as discussed earlier, network computer system 100 can recommend one or more nearby POIs for the service provider to select. For example, network computer system 100 can identify one or more alternative service locations that are POIs. In some examples, the network computer system 100 may determine that each identified POI satisfies a predetermined permissibility criterion. In some implementations, network system 100 can transmit an instruction to service application 135 to enable a service provider to change the service location of the service request when provider device 130 is within a proximity threshold of the service location of the service request.

Furthermore, in some implementations network computer system 100 can transmit a notification to service provider device 130 that includes one or more options corresponding to the one or more identified POIs for a service provider to select. Each option can associate the service request with an identified POI in place of an original service location associated with the service request. In some examples, each option can be associated with a reason why the corresponding POI is better than the original service location (e.g., service provider is in traffic and the identified POI is an easier location for service provider and user of requester device 120 to meet at). In such implementations, the reason can be given by the service provider either manually or by selecting from a predetermined set of reasons displayed on service application 135 (e.g., via a drop-down menu). In some implementations, network computer system 100 can automatically change the service location of the service request to the nearest identified POI, once network computer system 100 determines that the vehicle of the service provider is motionless. In either implementation, in some examples, network computer system 100 can only associate the service request with an identified POI if the user of requester device 120 consents (e.g., requester device 120 receives a request to change the service location of the service request and the user of the requester device 120 accepts the change).

In some implementations, using the previously discussed principles, once network computer system identifies a POI to associate the service request with, network computer system 100 can transmit an instruction to service application 125 to generate a graphical representation of the POI on a map interface of service application 125. In some implementations, network computer system 100 can provide an additional instructions or application data to service application 125, to cause service application 125 to highlight the graphical representations of the POI. In some examples of such implementations, such instructions can also be transmitted to service application 135. In other implementations, reasons why the corresponding POI is better than the original service location (e.g., heavy traffic is preventing the service provider from getting to the original service location) can also be transmitted to requester device 120.

Hardware Diagram

Figure 9:
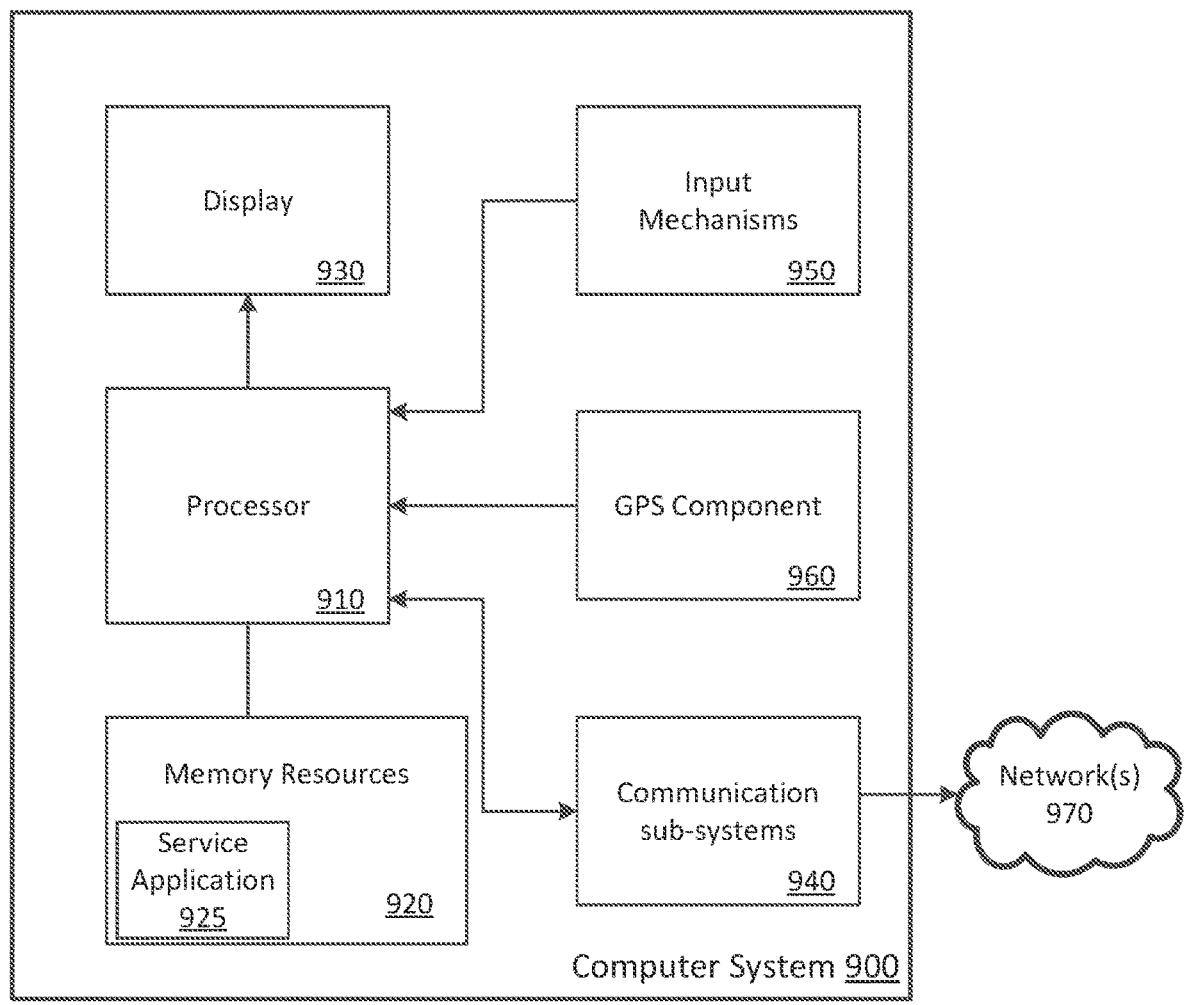
FIG. 9 illustrates a computer system upon which aspects described herein may be implemented.

FIG. 9 is a block diagram that illustrates a computer system upon which examples described herein may be implemented. In one embodiment, a computing device 900 may correspond to a mobile computing device, such as a cellular device that is capable of telephony, messaging, and data services. The computing device 900 can correspond to a device operated by a requester or, in some examples, a device operated by the service provider that provides location-based services. Examples of such devices include smartphones, handsets, tablet devices, or in-vehicle computing devices that communicate with cellular carriers. The computing device 900 includes a processor 910, memory resources 920, a display device 930 (e.g., such as a touch-sensitive display device), one or more communication systems 940 (including wireless communication systems), a sensor set 950 (e.g., accelerometer and/or gyroscope, microphone, barometer, etc.), and one or more location detection mechanisms (e.g., GPS component) 960. In one example, at least one of the communication systems 940 sends and receives cellular data over network(s) 970 (e.g., data channels and voice channels). The communications sub-systems 940 can include a cellular transceiver and one or more short-range wireless transceivers. The processor 910 can exchange data with a service arrangement system (not illustrated in FIG. 9) via the communications sub-systems 940 and over network(s) 970.

The processor 910 can provide a variety of content to the display 930 by executing instructions stored in the memory resources 920. The memory resources 920 can store instructions for the service application 925. For example, the processor 910 can execute the service application 925 to read sensor data from one or more sensors 950 of the computing device, and to transmit the sensor data, along with location data of GPS component 960 as local device data to a network computer system (e.g. network computer system 100).

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computing system comprising:
a memory that stores a set of instructions;
one or more processors that execute the set of instructions to:
communicate with a mobile device of a service provider to exchange data, including to receive status data for the service provider;
assign the service provider to a service request based at least in part on the received status data of the service provider, the service request being associated with a first service location from which a transport service is to be provided;
during a time interval preceding the service provider arriving at the first service location, determine, based on the received status data for the service provider, an action of the service provider to trigger a change to the first service location;
identify a second service location that satisfies one or more permissibility criteria of the service request based at least in part on the received status data for the service provider; and
communicate data to the mobile device of the service provider to cause the mobile device of the service provider to associate the service request with the second service location in place of the first service location.

2. The network computing system of claim 1, wherein the action is inferred based on a location data of the service provider.

3. The network computing system of claim 1, wherein the one or more processors identify the second service location by (i) identifying multiple alternative service locations for the first service location based on the received status data for the service provider, the multiple alternative service locations including the second service location, and (ii) selecting the second service location based at least in part on the second service location satisfying one or more permissibility criteria of the service request.

4. The network computing system of claim 3, wherein the one or more processors select the second service location based at least in part on an input of the service provider.

5. The network computing system of claim 3, wherein the one or more permissibility criteria is based at least in part on an estimated service completion time to fulfill the service request using the second service location.

6. The network computing system of claim 3, wherein the one or more permissibility criteria is based at least in part on an estimated service initialization time for using the second service location as compared to the first service location.

7. The network computing system of claim 3, wherein the one or more permissibility criteria is based at least in part on an estimated service duration for using the second service location as compared to the first service location.

8. The network computing system of claim 3, wherein the one or more permissibility criteria is based at least in part on a set of service parameters for fulfilling the service request using the second service location.

9. The network computing system of claim 8, wherein the one or more permissibility criteria is based at least in part on a set of service parameters for fulfilling the service request using the second service location as compared to the first service location.

10. The network computing system of claim 9, wherein the set of service parameters include at least one of a service initialization time, a service completion time, or a service duration.

11. The network computing system of claim 3, wherein the one or more processors select the second service location based at least in part on a comparison of a set of service parameters for fulfilling the service request using each of the multiple alternative service locations.

12. The network computing system of claim 11, wherein the set of service parameters include at least one of a service initialization time, a service completion time, or a service duration.

13. A non-transitory computer-readable medium that stores instructions, which when executed by one or more processors of a network computer system, cause the network computer system to perform operations that include:
communicating with a mobile device of a service provider to exchange data, including to receive status data for the service provider;
assigning the service provider to a service request based at least in part on the received status data of the service provider, the service request being associated with a first service location from which a transport service is to be provided;
during a time interval preceding the service provider arriving at the first service location, determining, based on the received status data for the service provider, an action of the service provider to trigger a change to the first service location;
identifying a second service location that satisfies one or more permissibility criteria of the service request based at least in part on the received status data for the service provider; and
communicating data to the mobile device of the service provider to cause the mobile device of the service provider to associate the service request with the second service location in place of the first service location.

14. The non-transitory computer-readable medium of claim 13, wherein the action is inferred based on a location data of the service provider.

15. The non-transitory computer-readable medium of claim 13, wherein the one or more processors identify the second service location by (i) identifying multiple alternative service locations for the first service location based on the received status data for the service provider, the multiple alternative service locations including the second service location, and (ii) selecting the second service location based at least in part on the second service location satisfying one or more permissibility criteria of the service request.

16. The non-transitory computer-readable medium of claim 15, wherein the one or more permissibility criteria is based at least in part on an estimated service completion time to fulfill the service request using the second service location.

17. A method for operating a network computer system, the method being implemented by one or more processors of the network computer system and comprising:

communicating with a mobile device of a service provider to exchange data, including to receive status data for the service provider;

assigning the service provider to a service request based at least in part on status data of the service provider, the service request being associated with a first service location from which a transport service is to be provided;

during a time interval preceding the service provider arriving at the first service location, determining, based on the receive status data for the service provider, an action of the service provider to trigger a change to the first service location;

identifying a second service location that satisfies one or more permissibility criteria of the service request based at least in part on the received status data for the service provider; and communicating data to the mobile device of the service provider to cause the mobile device of the service provider to associate the service request with the second service location in place of the first service location.

18. The method of claim 17, wherein the action is inferred based on a location data of the service provider.

19. The method of claim 17, wherein the one or more processors identify the second service location by (i) identifying multiple alternative service locations for the first service location based on the received status data for the service provider, the multiple alternative service locations including the second service location, and (ii) selecting the second service location based at least in part on the second service location satisfying one or more permissibility criteria of the service request.

* * * * *